United States Patent
Li et al.

(10) Patent No.: US 7,043,449 B1
(45) Date of Patent: May 9, 2006

(54) METHOD FOR CHARTING FINANCIAL MARKET ACTIVITIES

(75) Inventors: Vincent Ching Ping Li, Hong Kong (HK); Raymond Chong, Hong Kong (HK)

(73) Assignee: Prosticks.Com Limited, Wanchai (HK)

( * ) Notice: Subject to any disclaimer, the term of this patent is extended or adjusted under 35 U.S.C. 154(b) by 0 days.

(21) Appl. No.: 09/465,336

(22) Filed: Dec. 17, 1999

(51) Int. Cl.
*G06F 17/60* (2006.01)

(52) U.S. Cl. ..................... 705/36 R; 705/35
(58) Field of Classification Search ................. 705/37, 705/36, 35, 36 R
See application file for complete search history.

(56) References Cited

U.S. PATENT DOCUMENTS

| | | | |
|---|---|---|---|
| 5,347,452 A * | 9/1994 | Bay, Jr. | 705/37 |
| 5,581,677 A * | 12/1996 | Myers et al. | 345/440 |
| 6,272,474 B1 * | 8/2001 | Garcia | 705/37 |

FOREIGN PATENT DOCUMENTS

| | | | |
|---|---|---|---|
| JP | 06301682 | * | 10/1994 |
| JP | 202183465 A | * | 6/2002 |

OTHER PUBLICATIONS

Aan, Peter W., Evaluating Wilder's "Concepts" on 10 Years of Data Futures: The Magazine of Commodities & Options v19n4 PP: 32, 34 Mar. 1990.*

* cited by examiner

*Primary Examiner*—Michael Cuff
(74) *Attorney, Agent, or Firm*—Alix, Yale & Ristas, LLP

(57) ABSTRACT

A method and apparatus for augmenting the conventional price-time chart used for technical analysis of securities price movements. In a preferred embodiment, the method takes a conventional Bar Chart or Japanese Candlestick Chart with a definite timeframe and then for each bar on the chart; it statistically quantifies the volume and time distribution throughout the range of the bar into discrete elements, using price and volume data within the bar interval from a sub-timeframe. The discrete elements are then graphically overlaid on the bar in a way which preserves its original appearance as close as possible. The apparatus is an application software which implements the method by displaying the conventional price-time chart, calculating the relevant elements and overlaying the values on the chart bars, either in a static or real-time market setting.

23 Claims, 21 Drawing Sheets

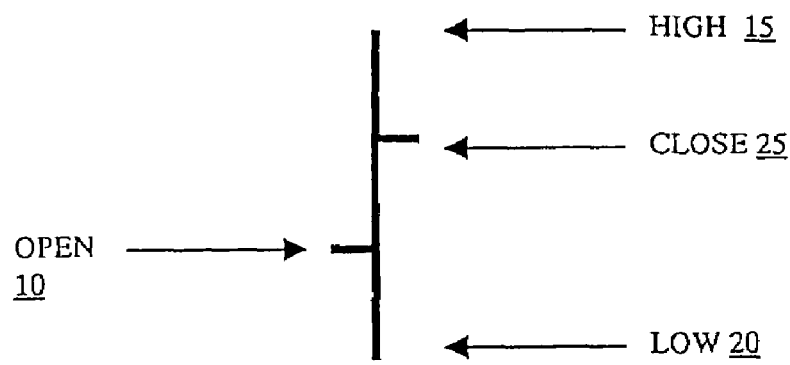
FIG. 1-A
PRIOR ART
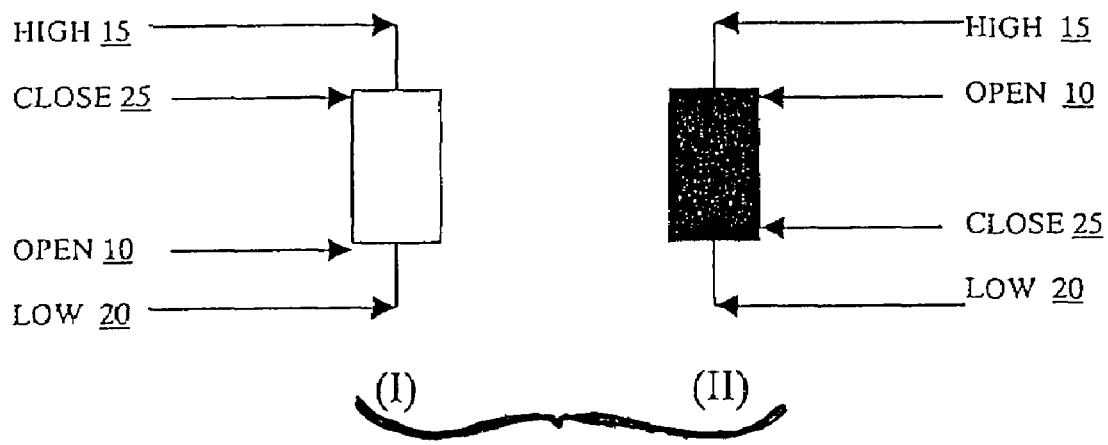
Fig. 1-B
PRIOR ART

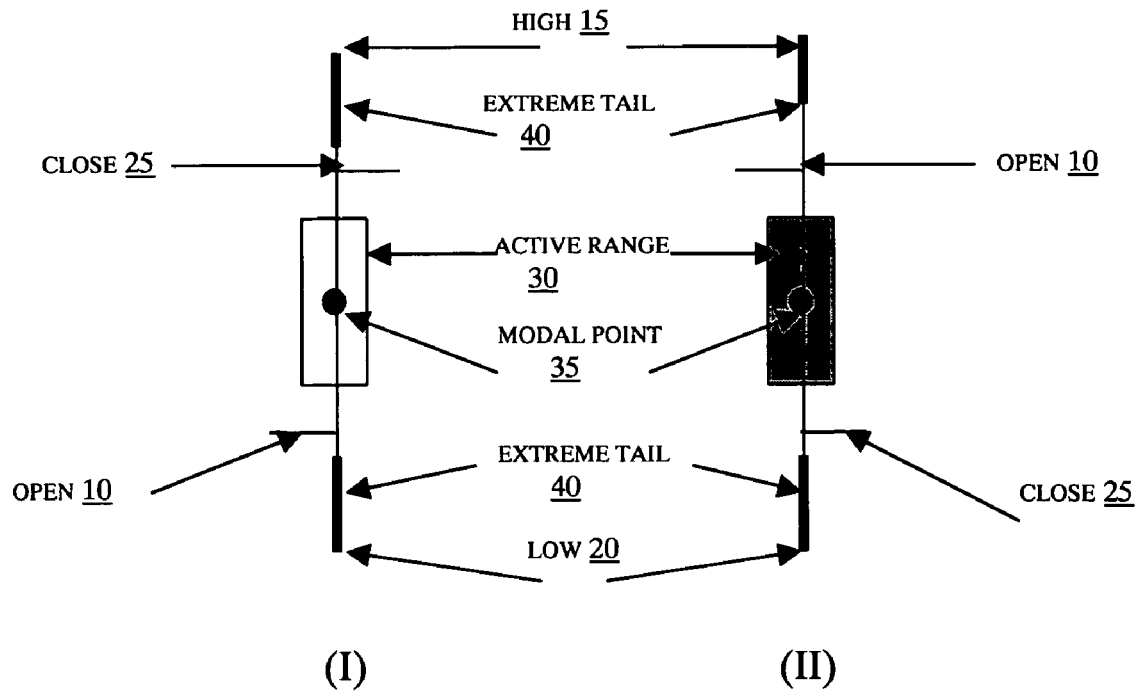
FIG. 2-A
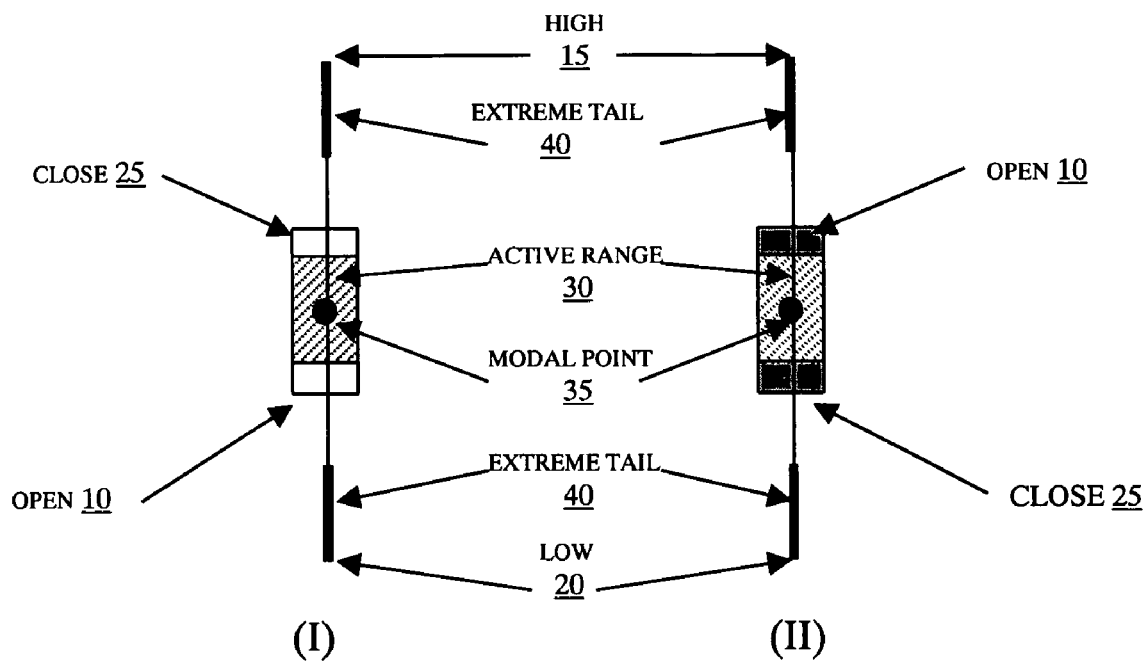
FIG. 2-B

FIG. 2-A-1
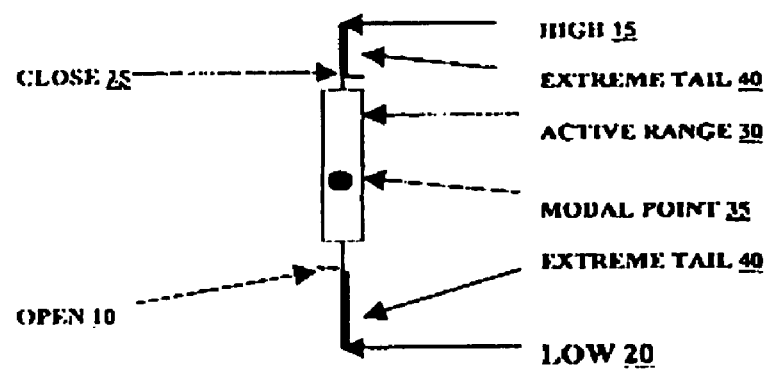
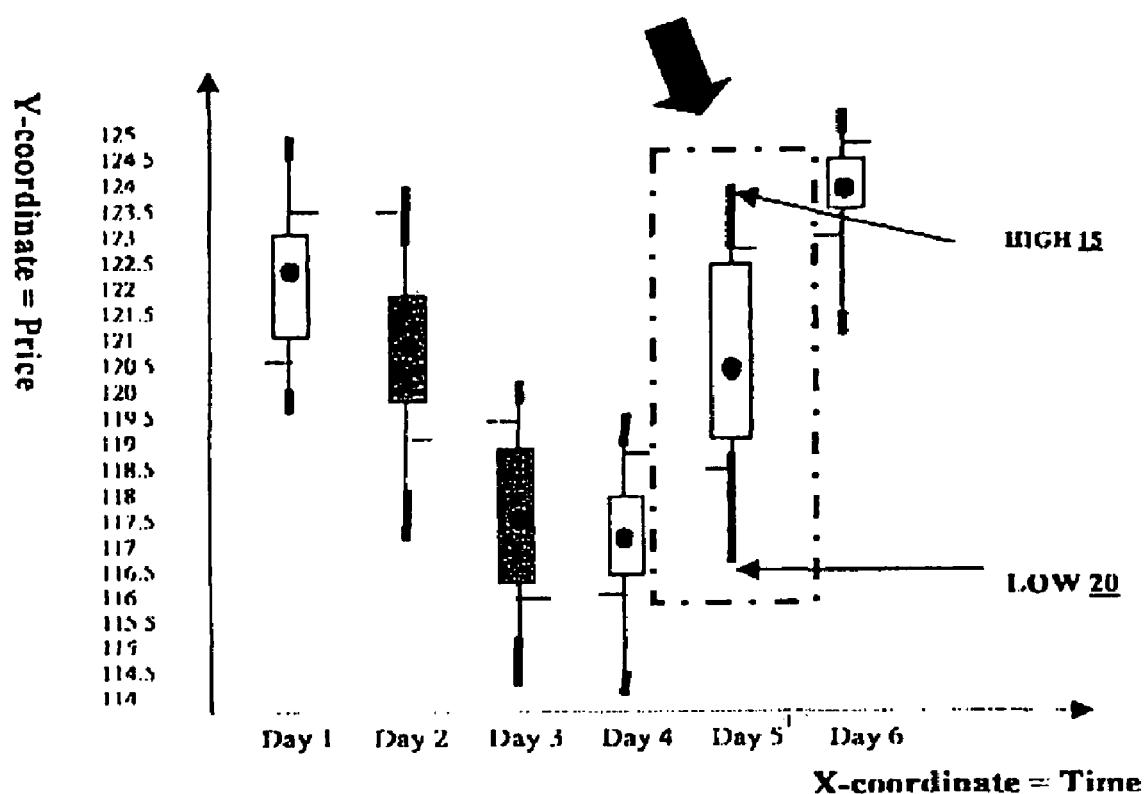

Assume:
  Preferred timeframe: DAILY,
  Base timeframe: 30-MIN
Price Data:
| Time | High | Low | Time | High | Low |
|---|---|---|---|---|---|
| 9:30-10:00 | 121 | 120 | 12:00-12:30 | 121 | 116.5 |
| 10:00-10:30 | 122 | 120.5 | 12:30-13:00 | 120.5 | 118.5 |
| 10:30-11:00 | 123 | 119.5 | 13:00-13:30 | 119.5 | 119 |
| 11:00-11:30 | 124 | 122.5 | | | |
| 11:30-12:00 | 122.5 | 120.5 | | | |
FIG. 6-A
Resulting Frequency Distribution Diagram By Time:
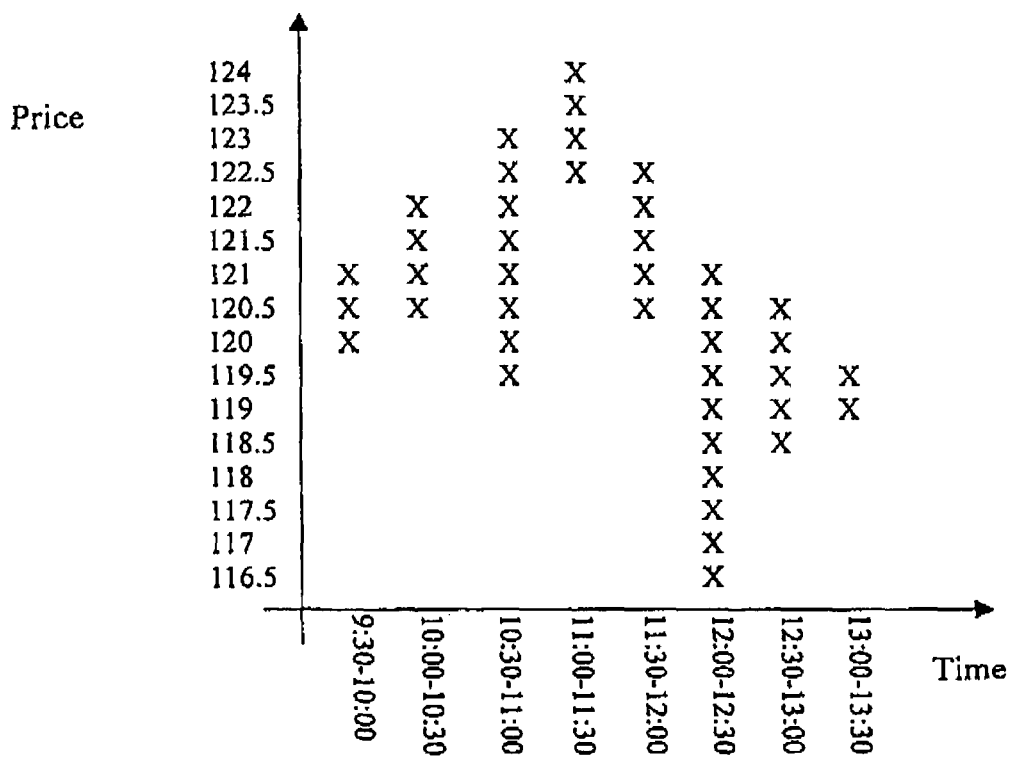
FIG. 6-B

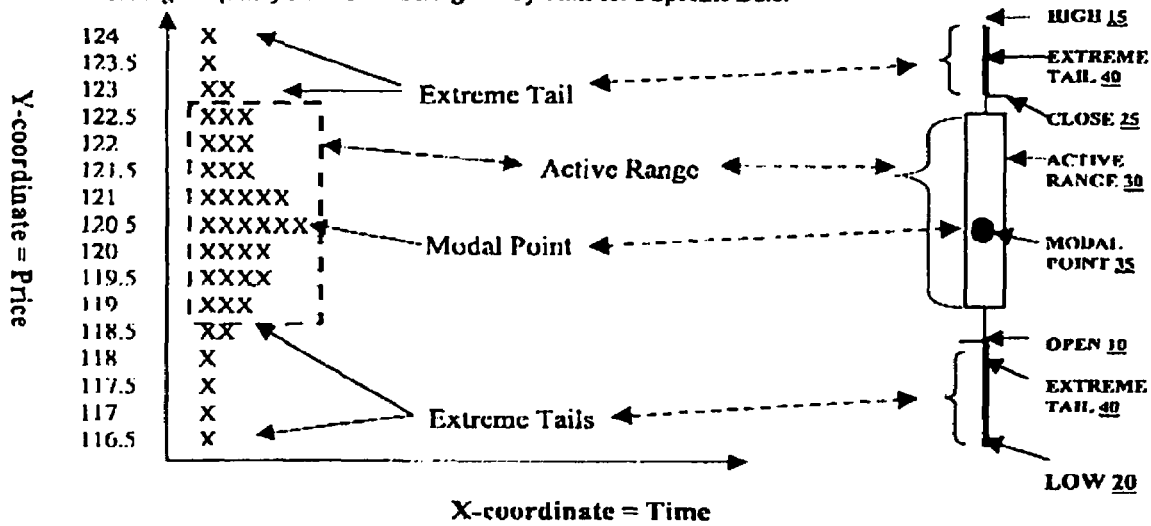

| PRICE | SHARES VOLUME ('000) | PRICE | SHARES VOLUME ('000) |
|---|---|---|---|
| 116.5 | 1000 | 120.5 | 6000 |
| 117 | 1000 | 121 | 5000 |
| 117.5 | 1000 | 121.5 | 3000 |
| 118 | 2000 | 122 | 3000 |
| 118.5 | 2000 | 122.5 | 3000 |
| 119 | 3000 | 123 | 2000 |
| 119.5 | 4000 | 123.5 | 1000 |
| 120 | 4000 | 124 | 1000 |
FIG. 7-A
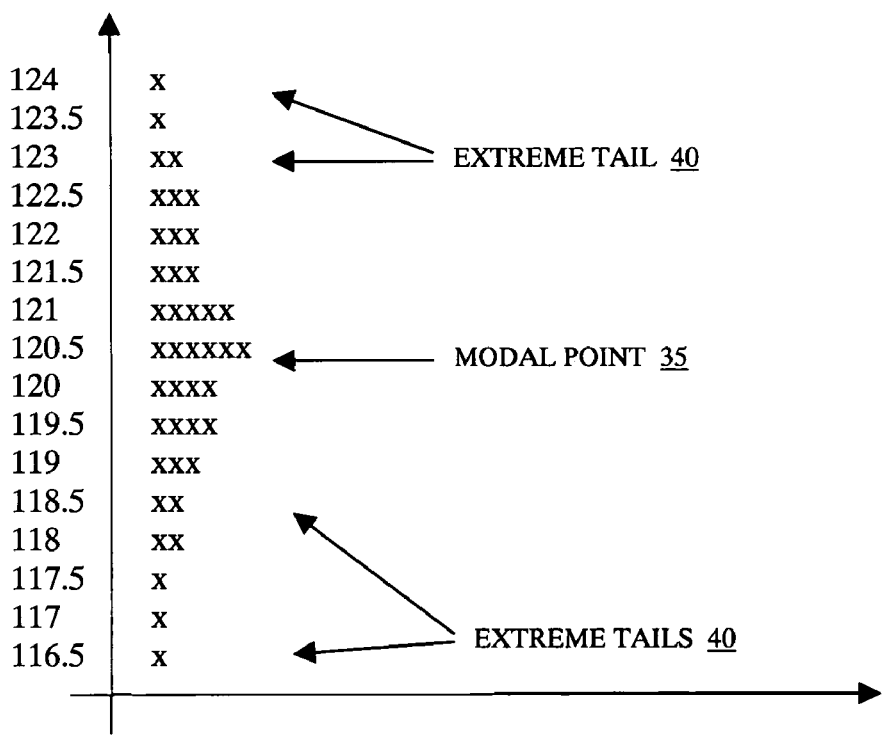
FIG. 7-B

| PRICE $(P)$ | FREQUENCY $(F)$ | $P \times F$ | $(P-\mu)^2 \times F$ |
| --- | --- | --- | --- |
| 124 | 1 | 124 | 16 |
| 123.5 | 1 | 123.5 | 12.25 |
| 123 | 2 | 246 | 18 |
| 122.5 | 3 | 367.5 | 18.75 |
| 122 | 3 | 366 | 12 |
| 121.5 | 3 | 364.5 | 6.75 |
| 121 | 5 | 605 | 5 |
| 120.5 | 6 | 723 | 1.5 |
| 120 | 4 | 480 | 0 |
| 119.5 | 4 | 478 | 1 |
| 119 | 3 | 357 | 3 |
| 118.5 | 2 | 237 | 4.5 |
| 118 | 2 | 236 | 8 |
| 117.5 | 1 | 117.5 | 6.25 |
| 117 | 1 | 117 | 9 |
| 116.5 | 1 | 116.5 | 12.25 |
| | $n = 42$ | $\sum f(x) = 5058.5$ $\mu = \dfrac{\sum f(x)}{n} = 120$ | $\sum (f(x) - \mu)^2 = 134.25$ $\delta = \sqrt{\dfrac{\sum (f(x) - \mu)^2}{n}} = 1.7879$ |

FIG. 8

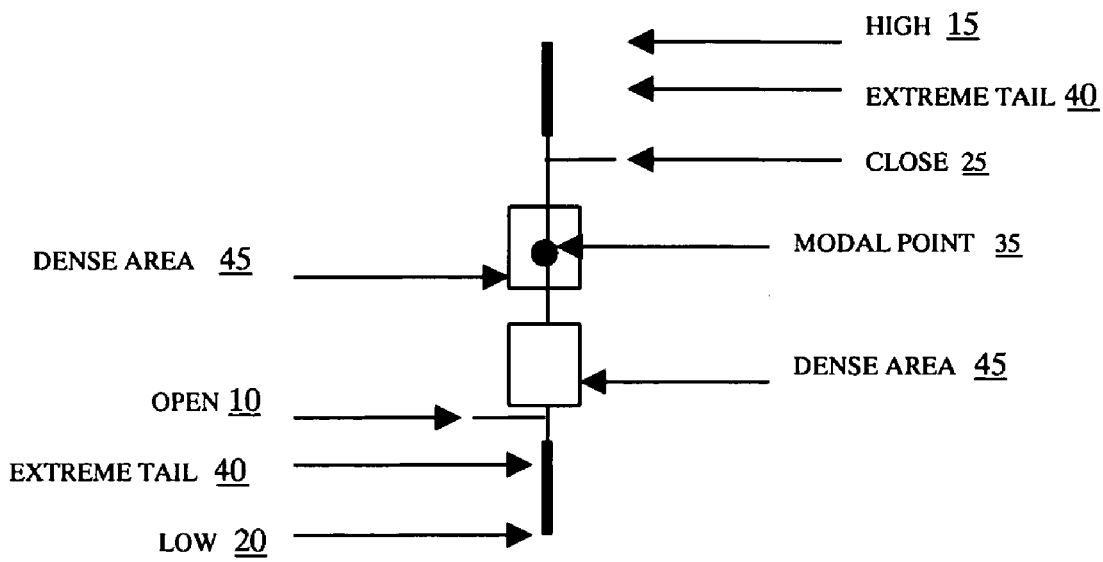
Fig. 13-A
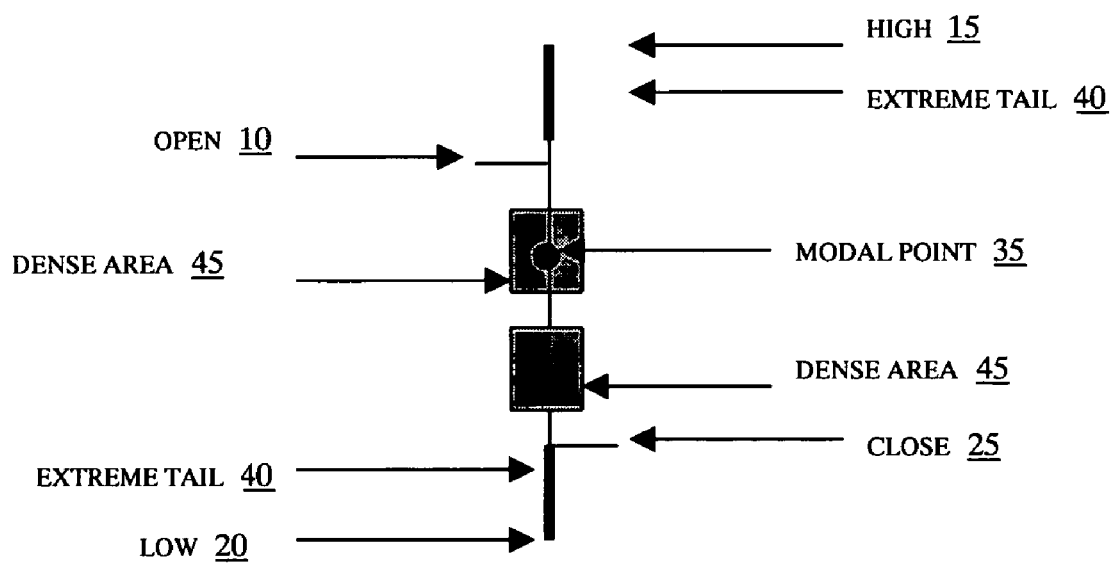
FIG. 13-B

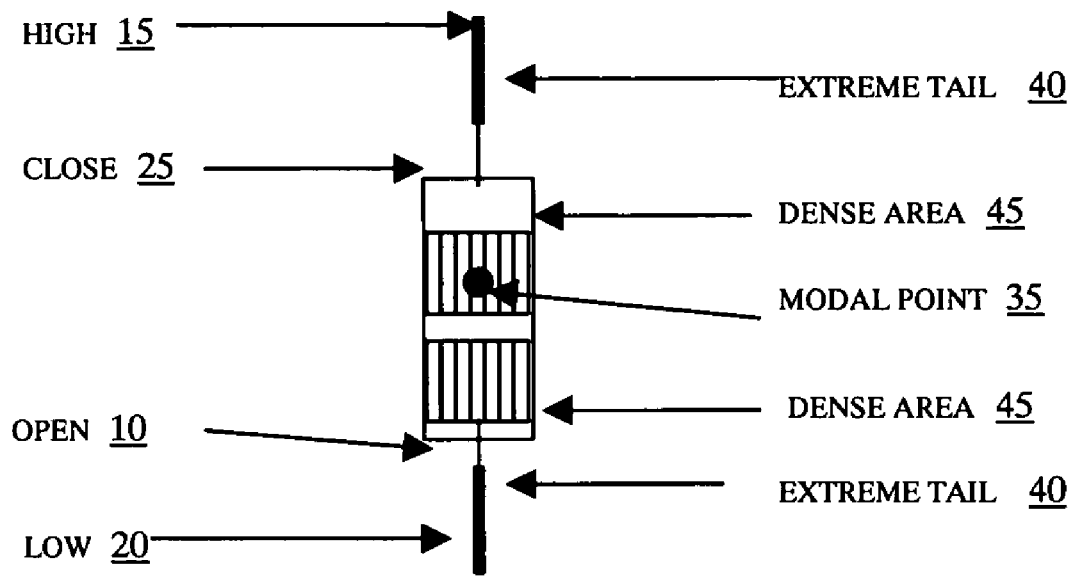
FIG. 14-A
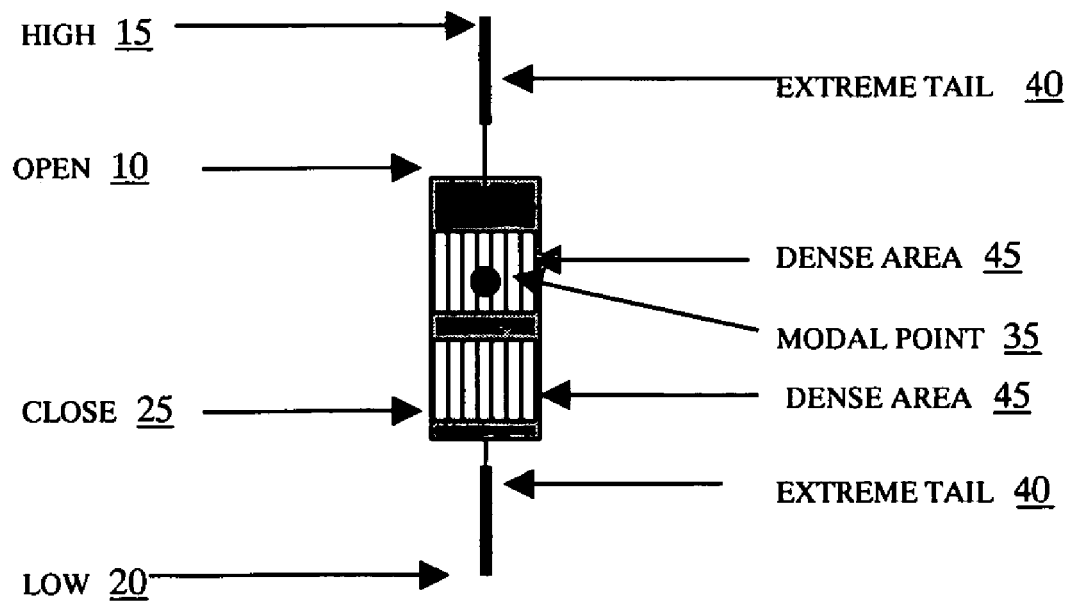
FIG. 14-B

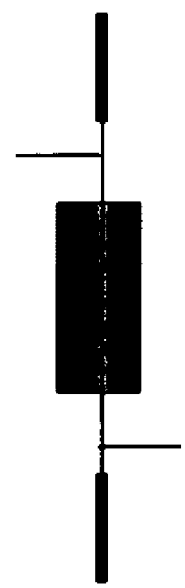
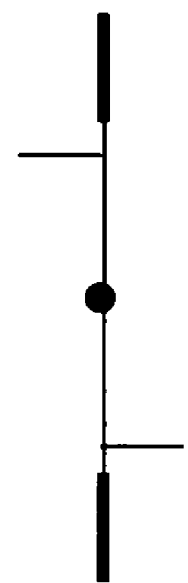
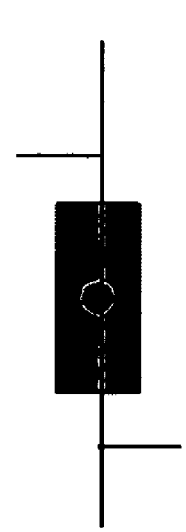
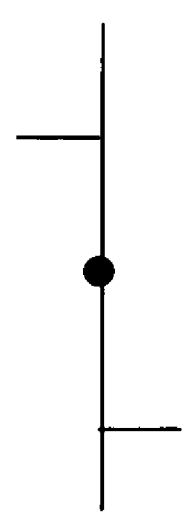
FIG. 15-A    FIG. 15-B    FIG. 15-C    FIG. 15-D
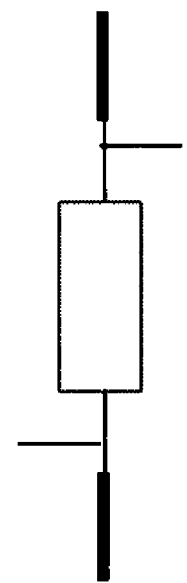
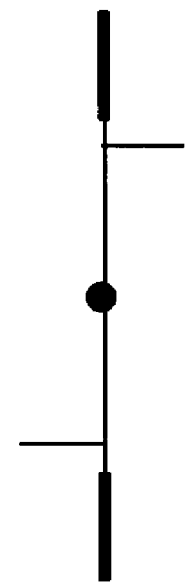
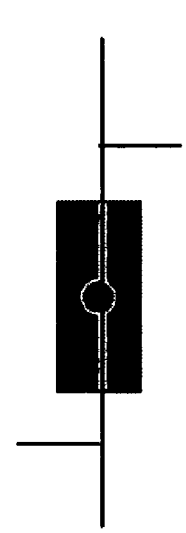
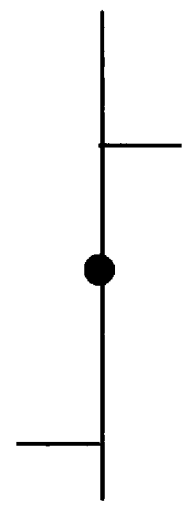
FIG. 15-E    FIG. 15-F    FIG. 15-G    FIG. 15-H

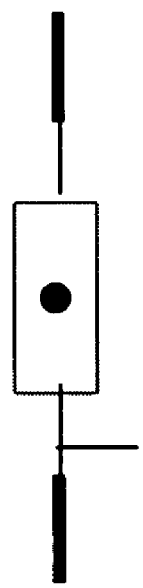
FIG. 16-A
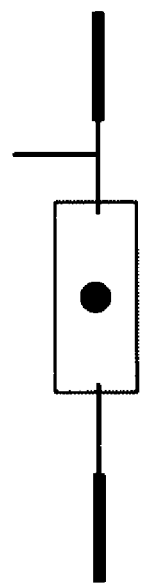
FIG. 16-B
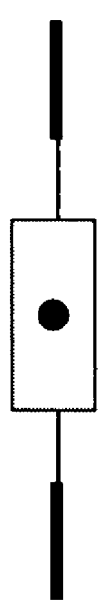
FIG. 16-C
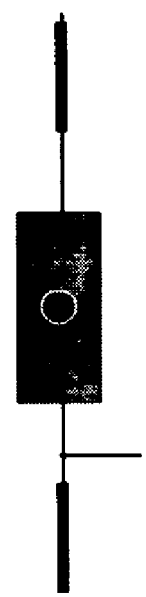
FIG. 16-D
FIG. 16-E
FIG. 16-F

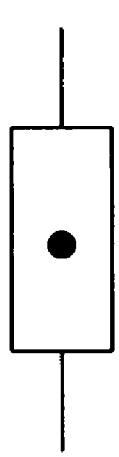
FIG. 17-A
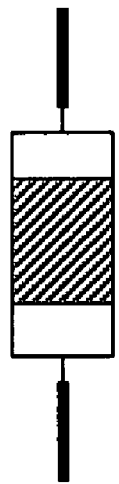
FIG. 17-B
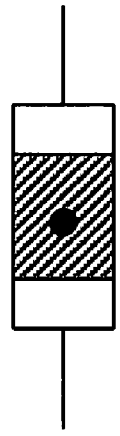
FIG. 17-C
FIG. 17-D
FIG. 17-E
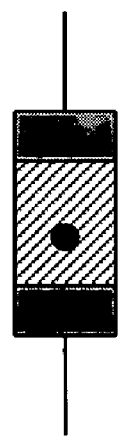
FIG. 17-F

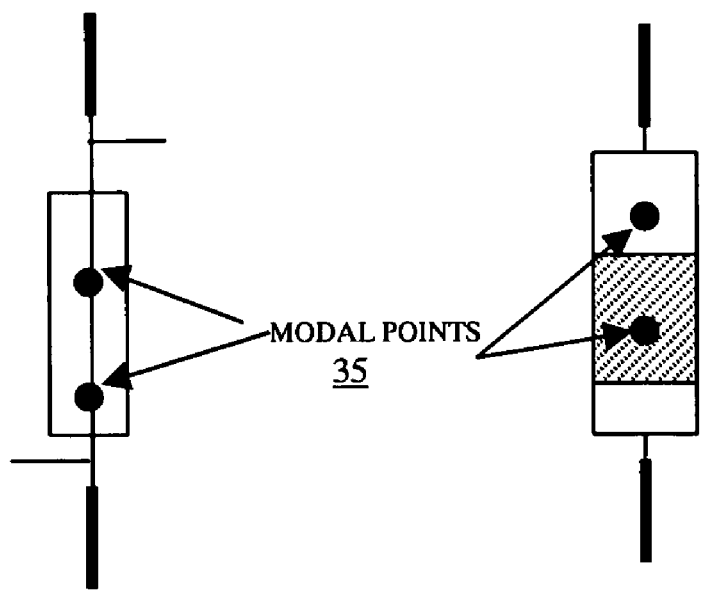
Fig. 18-A
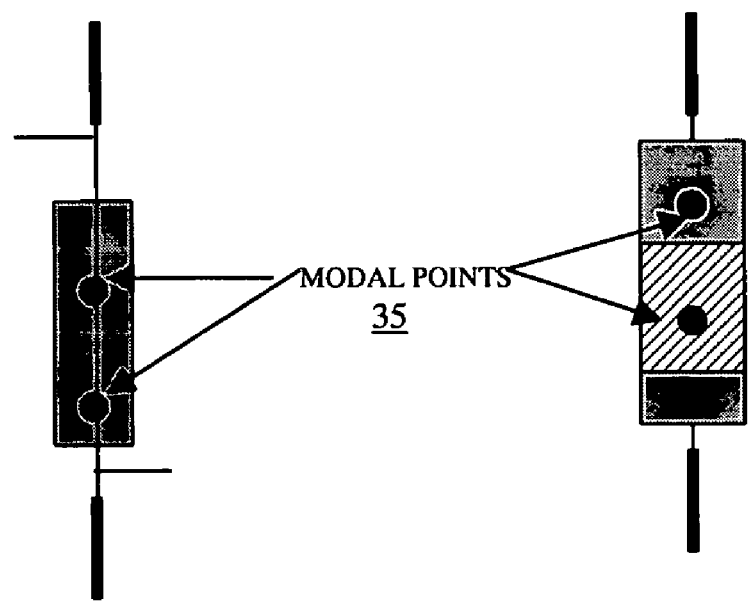
Fig. 18-B

METHOD FOR CHARTING FINANCIAL MARKET ACTIVITIES

BACKGROUND

1. Field of Invention

This invention relates to a computer implemented charting method for charting movements of financial market traded instruments by overlaying discrete quantified elements of time and volume distributions onto the conventional price-time chart.

2. Description of Prior Art

In financial charting, the Bar Chart and the Japanese Candlestick Chart are two forms of price-time charts most widely used by traders and analysts as means of predicting future price movements. Each bar in these two types of charts displays the open, high, low and close prices (herein after abbreviated as OHLC) traded by a financial instrument (e.g. stocks, indices, currencies) in a given time interval, which is called the timeframe of the chart. Thousands of tools and techniques have been developed based on the time-series analysis of these OHLC prices and collectively this is known as technical analysis.

However, for every financial commodity, between the market opening and closing, and within the high and low, there are a lot of other activities and phenomena taking place that are known to be useful for monitoring overall market conditions. For example, the area that market actively accumulates, the price that trades the most volume, and how the market behaves when the price reaches a certain high or low price vicinity. It is well-known that these intra-market information are used extensively though not visible from the conventional charts by traders and analysts formulating trading strategies.

The conventional OHLC charts which displays only the OHLC prices obviously fail to provide a complete picture of the underlying market conditions. The intermediary paths which the price moves from the open to close have been ignored. Traditionally, traders who want to keep track of such intra-market information have to rely on a tedious manual process, such as observing price ticks from a quote screen and recording the information into a log-book.

As said, for a given bar, subtle intra-market information cannot be observed from its mere OHLC prices. Nevertheless, this information can be deduced by analyzing the distributions of time spent and volume traded across prices in the bar. For example, by building a frequency distribution diagram which records the amount of time/volume units traded for each price on the bar, information such as which price ranges contain high activities, low activities and most activities can be easily discerned. Furthermore, various statistical parameters can be computed based on this distribution. By graphically overlaying a subset of this information onto the conventional OHLC chart using simple geometric figures such as a colored dot or a rectangle, a new type of chart is formed.

Under the present invention, this resulting new form of chart is made to resemble the conventional chart as much as possible so that traders who are used to view the latter will not find the new chart unfamiliar, but rather, more informative.

SUMMARY OF INVENTION

With the above background in mind, it is an object of the present invention to augment the conventional OHLC price-time chart by overlaying it with discrete quantified elements of intra-market activities relating to time/volume distribution across different prices.

As such, it is an object of the present invention to identify at least one corresponding price level which is most actively traded for each bar on the price-time chart, which is called the Modal Point. Trading activities could be the volume traded or the amount of time the market spends trading at a price, or both.

Another object of the present invention is to identify at least one continuous price range which contains substantial trading activities for each corresponding bar on the price-time chart, which is called the Dense Area.

Another object of the present invention is to identify the fair market value of the bar by locating a correspondingly continuous price range which contains the bulk of trading activities, called the Active Range.

A further object of the present invention is to identify continuous price ranges at both ends of the bar which contain minimal trading activities, called Extreme Tails. Those who are skilled in the art will appreciate that if the price vicinity near the high or low of the bar has minimal trading activities, in terms of either time or volume, it signifies that the corresponding resistance or support at the vicinity is considerable.

Another object of the present invention is to graphically overlay at least one of the above information on the corresponding bar in the OHLC chart, in a visually facilitated manner.

To identify discrete values of the above said intra-market elements, for each bar in the price-time chart, the corresponding price and volume data from a sub-timeframe are gathered. A frequency distribution diagram is then plotted accordingly and the values of the elements are derived directly from the diagram and overlaid on the price-time chart.

FIG. 1-A shows a bar in a conventional Bar Chart while FIG. 1-B shows a bar in a conventional Japanese Candlestick Chart. FIG. 1-B (I) shows the bar when the close price 25 is above the open price 10 while FIG. 1-B (II) shows the close price 25 being below the open price 10. As shown in FIG. 1-B, the rectangle enclosing the open 10 and close 25 price of the bar is called the "body" of the bar. By conventional standard, if the close 25 price is higher than the open price 10, the body is hollow, as shown in FIG. 1-B (I). If the close price 25 is lower than the open price 10, the body is filled, as shown in FIG. 1-B (II).

In one of the preferred embodiments, if the underlying price-time chart is a Bar Chart, the appearance of a bar of the present invention is shown in FIG. 2-A. FIG. 2-A (I) shows the case of the close price 25 being above the open price 10 while FIG. 2-A (II) shows the close price 25 being below the open price 10. In both diagrams, the Modal Point 35 is marked as a small colored dot on the central axis of the bar. In FIG. 2-A, only the Active Range 30 but not the Dense Area 45 is displayed. The Active Range 30 is displayed as a rectangle enclosing symmetrically around the central axis (the line connecting the high and low) of the bar with a coloring scheme which distinguishes it from whether the close 25 is above or below the open 10. In one preferred embodiment, if the close 25 is above the open 10, as shown in FIG. 2-A (I), the rectangle is hollow. Otherwise, it is colored, as shown in FIG. 2-A (II). This coloring scheme makes the rectangle resemble the body of the Japanese Candlestick and thus the resulting bar of the present invention looks familiar to users who are used to viewing the Japanese Candlestick Chart. In the preferred embodiment, Extremes Tails 40 are displayed as thick, distinctly colored lines overlaid on the central axis of the bar. However, only either the Active Range 30 or the Dense Areas 45 can be displayed but not both. This is to avoid too much information with similar presentation styles blurring the appearance of the original bar.

In the preferred embodiment, if the underlying price-time chart is a Japanese Candlestick chart, the appearance of a bar under the present invention is shown in FIG. 2-B. FIG. 2-B (I) shows the case of the close price 25 above the open price 10 while FIG. 2-B (II) shows the close price 25 below the open price 10. As shown in both diagrams, the Modal Point 35 is marked as a small dot on the virtual axis (the imaginary line connecting the high and low) of the bar. The Extreme Tails 40 are displayed as distinctly colored lines overlaid on the virtual axis. In FIG. 2-B, only the Active Range 30 but not the Dense Areas 40 is displayed. The Active Range 30 is displayed as a rectangle enclosing symmetrically around the vertical axis. The rectangle has stripes patterns to distinguish it from the body of the original candlestick which is also a rectangle. Only either the Active Range or the Dense Area is displayed, but not both.

Alternative embodiments involve representing the various information using different geometric figures, size, coloring scheme and texture. Those with an ordinary skill of art are able to conceive different graphical combinations of overlaying part or all of the elements on the bar. The spirit of the present invention is to overlay intra-market elements on the OHLC bar in a visually facilitated manner such that the user will not find the resulting overlaid bar strange compared to the bars of the conventional Bar Chart or the Japanese Candlestick Chart which they are familiar with.

One aspect of the present invention involves an application software program which displays the conventional OHLC chart, calculates the intra-market components under the given timeframe for each bar on the chart and overlays the values onto it. This program may allow the user to select which elements and in what form (geometric shape, color, size etc) they are to be overlaid. However, it has a default setting that corresponds to the preferred embodiment described above.

Before the present invention, traders who want to keep track of volume and time distribution information have to do so manually. Furthermore, they do not have consistent quantifying standard and only rely on rough estimation. Under the present invention, with the intra-market information quantified and overlaid on the chart, traders no longer need to observe and memorize them on their own but can retrieve them instantly from the chart. Furthermore, analyses of their time-series behavior as well as their relationships with the usual OHLC are facilitated. New trading insights can then be formed more easily and new technical analysis theories can be developed in conjunction with these invention.

BRIEF DESCRIPTIONS OF THE DRAWINGS

The accompanying drawings are included to provide a further understanding of the invention. These drawings are incorporated in and constitute a part of this specification, illustrate preferred embodiments of the invention, and together with the description, serve to explain the principles of this invention.

In the drawings:

FIGS. 1A and 1B show a bar of the conventional Bar Chart and Japanese Candlestick Chart FIGS. 2A and 2B show an embodiment of the appearance of a bar formed by the present invention.

FIGS. 6A and 6B illustrate the building of a frequency distribution diagram by time using price data of base timeframe.

FIGS. 7A and 7B illustrate the building of a frequency distribution diagram by volume using price-volume data of tick.

FIG. 8 illustrates an example of deriving Active Range using the Mean-Deviated method.

FIGS. 13A and 13B illustrate one embodiment of the appearance of a bar formed by the present invention showing the Dense Areas, Modal Point, and Extreme Tails with the underlying price-time chart being the Bar Chart.

FIGS. 14A and 14B illustrate one embodiment of the bar formed by the present invention showing the Dense Areas, Modal Point and Extreme Tails with the underlying price-time chart being the Japanese Candlestick Chart.

FIGS. 15A–15H illustrate alternative embodiments of the bar formed by the present invention showing a subset of the Active Range, Modal Point and Extreme Tails with the underlying price-time chart being the Bar Chart.

FIGS. 16A–16F illustrate alternative embodiments of the bar formed by the present invention showing the Active Range, Modal Point and Extreme Tails with the underlying price-time chart being a hybrid of the Bar Chart in which the open price, close price, or both are not displayed.

FIGS. 17A–17F illustrate alternative embodiments of the bar formed by the present invention showing a subset of the Active Range, Modal Point, and Extreme Tails with the underlying price-time chart being the Japanese Candlestick Chart.

FIGS. 18A and 18B illustrate alternative embodiments of the bar formed by the present invention showing more than one Modal Point.

DETAILED DESCRIPTION OF INVENTION

Figure 3:
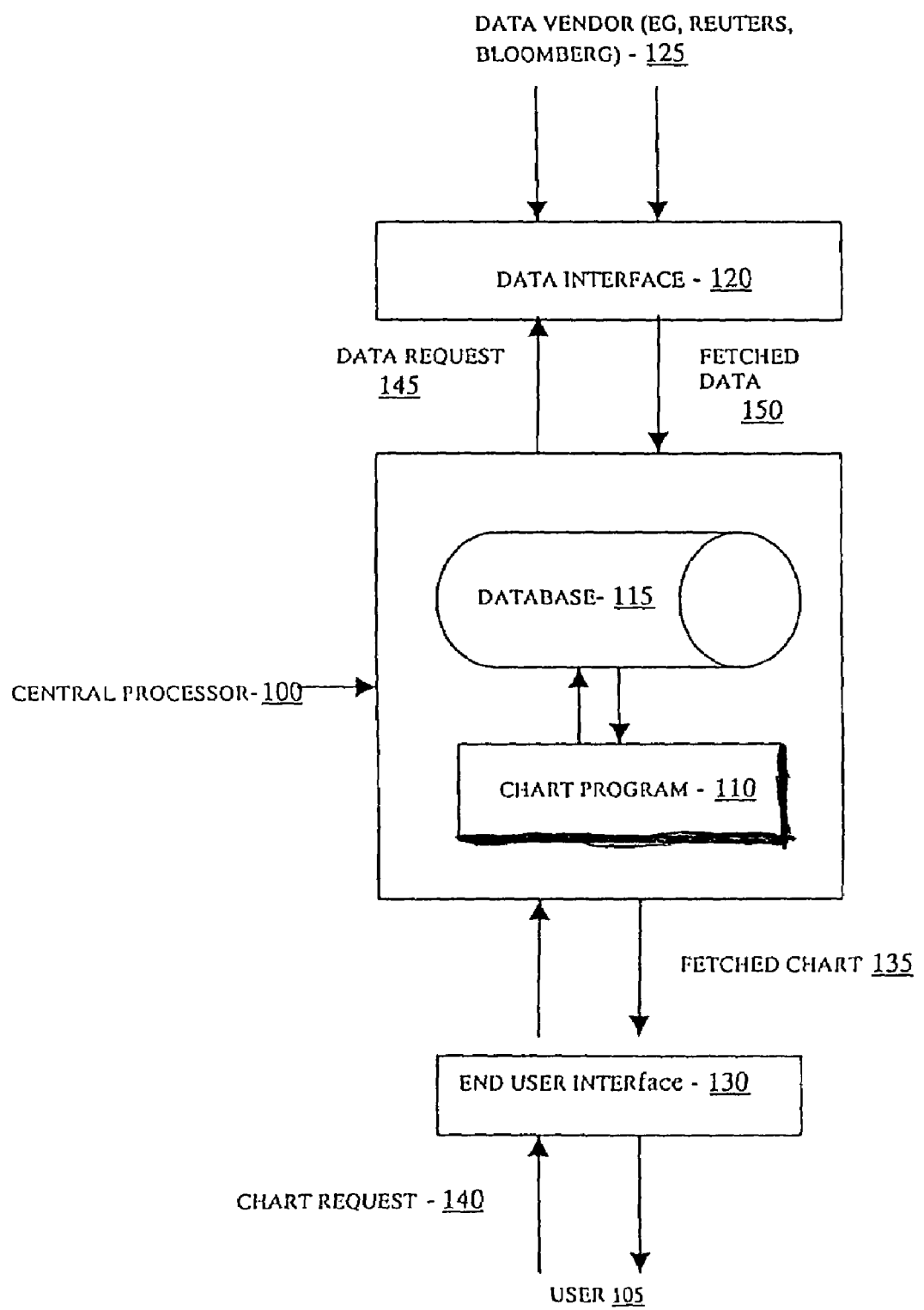
FIG. 3 illustrates a first embodiment of the apparatus of the present invention.

In this section, the present invention is described in detail with regard to the drawing figures briefly described above.

Terminology

For the sake of subsequent discussion, the term "volume" means either shares or dollar amount turnover. It also applies to open interest of futures and commodities.

The term "bar" is used to mean a graphical entity for a given time interval on any price-time chart, no matter if it is a Bar Chart or Japanese Candlestick Chart.

The term OHLC means open, high, low and close prices which are respectively the first, highest, lowest, and the last traded price in the time period.

The term "OHLC chart" means a Bar chart, a Japanese candlestick chart, or a special form of chart which looks like the Bar Chart but without the open price, or the close price, or both.

For a bar on the Bar Chart, the central vertical line joining the high and low price is called the central axis.

For the candlestick, the rectangle encompassing the open and close price is called the body.

The imaginary vertical line joining the high and low price on the stick is called the virtual axis.

The term "bar interval" refers to the time period represented by the bar.

"Bar range" refers to the distance between the bar high and bar low.

"Preferred timeframe" refers to the selected timeframe of the displayed price-time chart. "Base timeframe" refers to the timeframe of the price and volume data used to calculate the values of the intra-market elements. The base timeframe is smaller than the preferred timeframe. To give an example, suppose the preferred timeframe is daily and the system is set to calculate the intra-market elements using 5-minute data, the base timeframe is 5-minute. "Base bar" refer to a bar in the base timeframe. In the given example, a base bar will be a 5-minute bar of the given day.

System Architecture

An overview of an embodiment of the present invention is illustrated in FIG. 3 Specifically, the apparatus of the present invention comprises a central processor 100 which runs the computer readable chart program 110 according to an embodiment of the present invention, database 115, end user interface 130, and a data interface 120 for fetching real-time or historical price data from the outside data vendor 125. Via this apparatus, a user 105 is able to specify a chart request 140 and retrieves a fetched chart 135 of the present invention.

The operators performed by the central processor 100 running the chart program 110 according to an embodiment of the present invention and described below. The computer readable software is written in the form of a computer executable program (hereinafter "the chart program"), and is written, for example, in scripting languages such as C, Visual C++, JAVA, Visual Basic, and the like. The central processor 100 uses a multitasking operating system such as UNIX, OS/2, NT, or VMS. It is understood that the chart program may execute on a wide variety of platforms such as PCs, MACs, Power PCs, workstations, laptops, Palms, cable set-top boxes, video game hardware, information appliances, television, PDA, and the like and are within the scope of the present invention. The central processor 100 is a conventional computing device comprising a CPU, memory and storage devices. A conventional computer or computer workstation with sufficient memory and processing capability may be used as the central processor 100. In another embodiment, the central processor 100 operates as a server which receives multiple chart request 140 from various client systems connected to a network (such as a local network, the Internet, or a wireless digital network) and send a fetched chart 135 to each of them.

Database 115 is used to store historical OHLC price and volume data for various financial instruments as well as their respective historical intra-market elements. Various user or system defined parameter settings are stored here and also inside the parameter file 185. Oracle 8, manufactured by Oracle Corporation can be used to create and manage these databases. Settings stored inside parameter file 185 can either be defined by the system or by the user via the end user interface 130. In another embodiment, part or all of the data stored in database 115 are kept in the memory of the central processor 100 such as RAM instead.

Data interface 120 is the gateway for the central processor 100 to fetch real-time or historical price and volume data from external data vendors 125 such as Reuters, Bridge or Bloomberg. If the central processor 100 resides in a client workstation supplied by such data vendors, the chart program can easily be configured to receive live and historical data via a DDE Protocol (Dynamic Data Exchange) or API (Application Program Interface). A hot link or a warm link can be established. In a hot link, the chart program 110 specifies which instrument it wants to get live data from via the data request 145. The data vendor 125 then delivers live fetched data 150 of the specified instrument continuously to the chart program 110. In both types of links, the chart program 110 specifies the instrument name and types of data via the data request 145. The data vendor 125 will then deliver the requested fetched data 150 to the chart program 110. In a hot link, the data vendor 125 continuously delivers to the chart program 110 updated live data while a warm link does not do so. Historical data are requested using a warm link.

Alternatively, if the central processor 100 does not reside on the client workstation of the data vendor 125, the data interface 120 can connect the central processor 100 to the data vendor 125 via an Internet connection using a public switched phone network, such as those provided by a local or regional telephone operating company and obtain data from vendors henceforth. Such connections may also be provided by dedicated data lines, cellular, Personal Communication System ("PCS"), microwave, or satellite. After fetching data from the vendors, the chart program 110 stores the data in database 115 so that in the future, the same data need not be fetched again.

It should be noted that in an embodiment in which the apparatus does not support real-time data, the data interface 120 can be omitted.

End user interface 130 may comprise a display device and an user input device. The display device can be a computer monitor, TV screen, or display screen of a mobile phone. The user input device can be a keyboard, mouse pad, a remote channel, a pointer device, a voice recognition system or a keypad of a mobile phone.

Using the above components, the present invention provides a method and apparatus to display a refined form of price-time chart which involves quantifying intra-market elements from sub-timeframe price/volume data and then graphically overlaying the elements onto the conventional OHLC chart. The intra-market elements are related to the time/volume distributions across prices for the bars.

Figure 4:
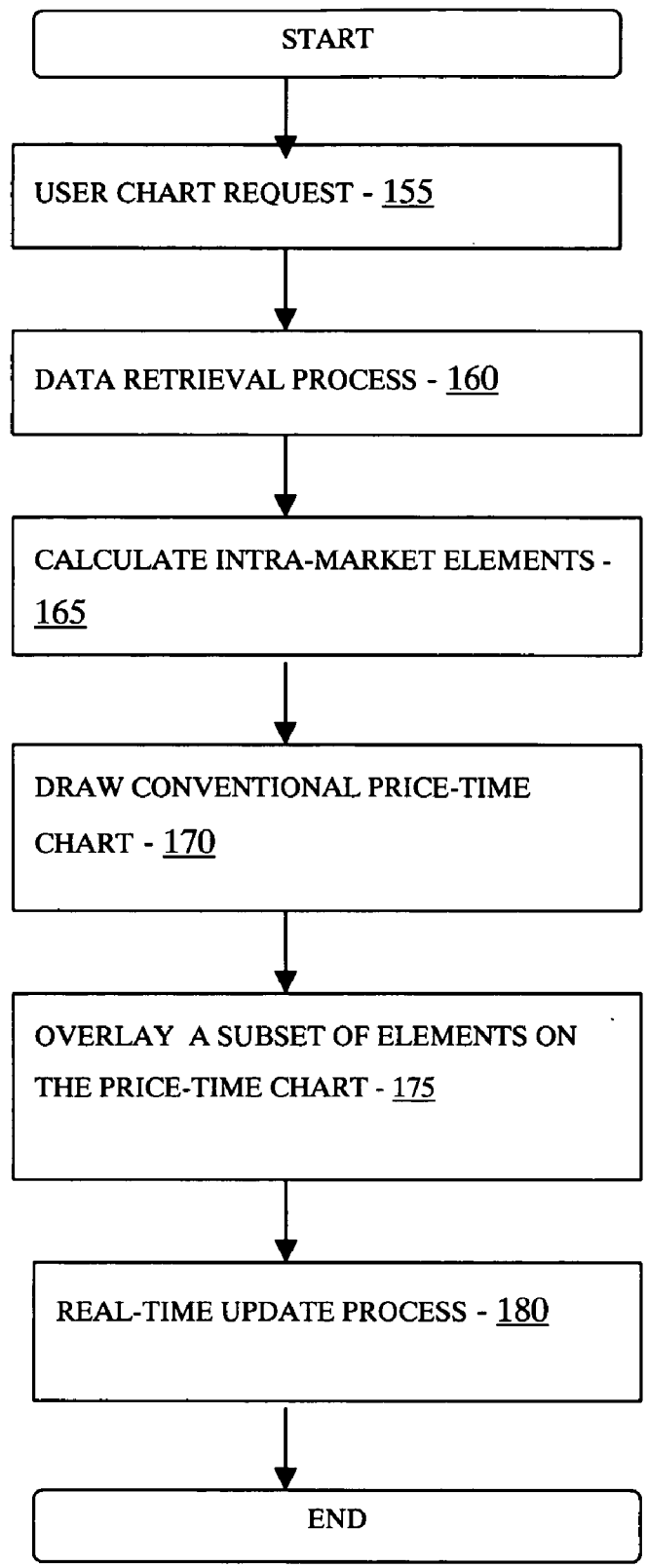
FIG. 4 illustrates an exemplary process flow when a user submits a chart request.

FIG. 4 shows the procedure performed by the system once a user submits a chart request 140 shown in FIG. 3. The chart request 140 is a request submitted to the chart program 110 by user 105 for requesting a price-time chart of the present invention to be displayed on the end-user interface 130. The user 105 submits the chart request 140 via the end user interface 130. The request may include an input of the names or symbol of the requested financial instrument as well as the timeframe of the requested chart (eg. daily, weekly, or hourly). As shown in FIG. 4, on receiving the chart request in step 155, in step 160, the chart program 110 retrieves the relevant OHLC data in order to plot the underlying conventional chart such as the Bar Chart and the Japanese Candlestick Chart. It will also retrieve the relevant OHLC and volume data of the base timeframe in order to calculate the relevant intra-market elements. The data can be either fetched from the database 115 or through an external data vendor 125 via the data interface 120. For example, it can establish a warm link using a DDE protocol and submit a DDE data request 145 to the data vendor 125 which then returns the given fetched data 150 via a handshaking mechanism. Afterwards, in step 165, the chart program 110 calculates the relevant intra-market elements using the fetched data 150. Alternatively, the elements can be also fetched from database 115 if they have been calculated and stored previously during a prior chart request in step 160. After fetching the data and calculating the elements, the chart program 110 displays the conventional bar chart of the requested timeframe (Bar chart or Japanese Candlestick) in step 170 and then graphically overlay the corresponding intra-market elements on it in step 175. The fetched chart 135 is then shown to the user 105 via the end user interface 130. Calculated intra-market elements are stored in database 115 for future use. The above calculations are normally finished in less than one second. It should be noted that steps 170 and 175 can be performed by the chart program 115 together.

The stored intra-bar market elements may need to be updated if either the user or the system modifies the settings in parameter file 185 which are related to the calculation step 165.

In a real-time setting, when live fetched data 150 is received by the chart program 110 from the data vendor 125 via data interface 120, the chart program 110 needs to recalculate some of the intra-market elements and update the chart display. This is accomplished by the Real-time Update Process 180 in FIG. 4 which will be discussed in more detail hereafter in connection with the Real-Time Embodiment.

Frequency Distribution Diagram

Figure 5:
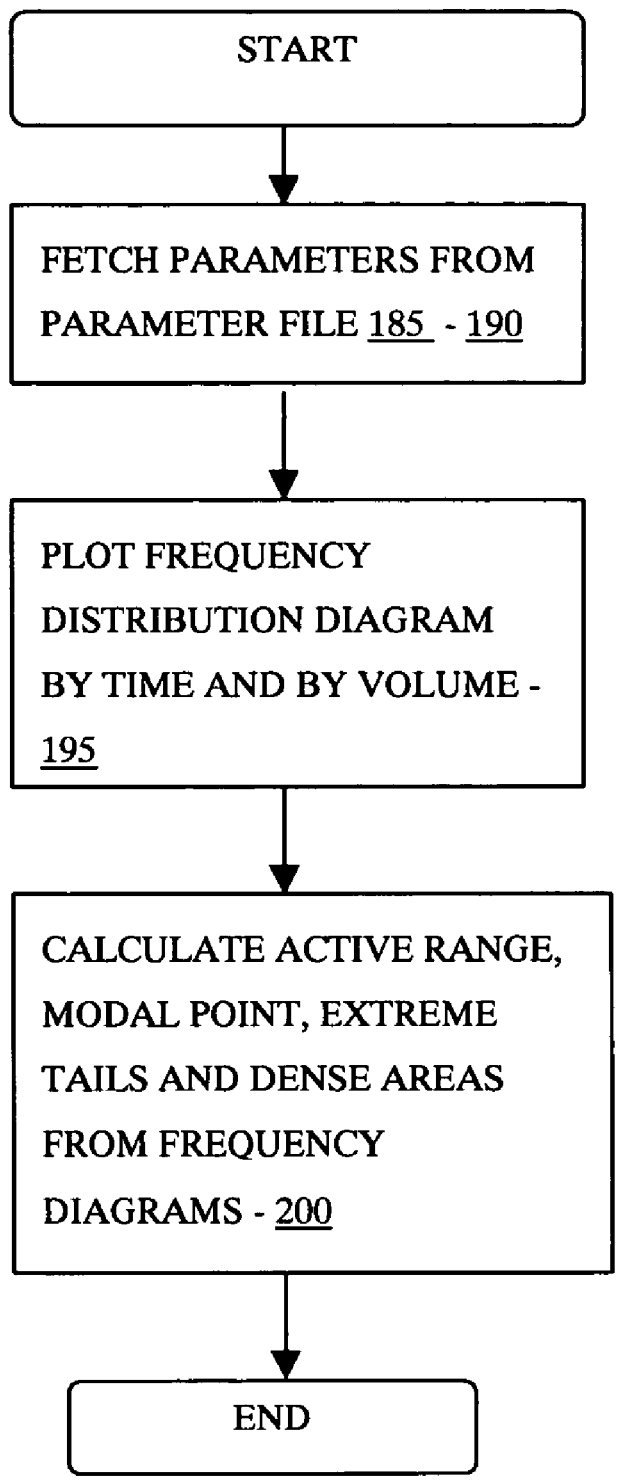
FIG. 5 illustrates the process of calculating intra-market elements after receiving an end-user chart request.

An exemplary outline of step 165 to calculate the intra-market elements is shown in FIG. 5. To calculate the intra-bar market elements of a given preferred bar, the corresponding price-time and volume data in the base timeframe are fetched in the step 160 of FIG. 4. Various parameter settings are read from parameter file 185 in step 190. The parameter file 185 resides inside database 115. Afterwards, a frequency distribution diagram is built. There are two methods to build the frequency distribution diagram: by time or by volume. In the preferred embodiment, the frequency distribution diagrams are invisible to the user 105. The chart program builds it internally in order to derive the values of the intra-market elements in step 200. In the preferred embodiment, the intra-market elements include the Active Range 30, Modal Point 35, Extreme Tails 40, and Dense Areas 45. In alternative embodiments, the intra-market elements include a subset of them.

FIGS. 6A and 6B illustrate an exemplary embodiment of building a frequency distribution diagram for a particular day by the time method using the day's corresponding 30-minutes price data. Thus, the preferred timeframe is daily while the base timeframe is 30-minute. FIG. 6-A shows the high price and low price for each of the 30-minute interval within the day. According to FIG. 6-A, the market opens at 9:30 and closes at 13:30 on that day. Based on the data, a frequency distribution diagram is derived which is shown in FIGS. 6-2. As can be seen, the Y-axis of the diagram indicates discrete price levels each separated by an increment unit of 0.5 while the X-axis represents frequency. The value of the increment unit is read from parameter file 185.

The steps of building the frequency distribution diagram are now discussed.

As shown in the table in FIG. 6-A, the first base bar, which corresponds to 9:30–10:00, has a high of 121, and a low of 120. A 'X' is marked on each of 120, 120.5, and 121 on the diagram. Next, the second base bar, which corresponds to 10:00–10:30, is examined. The second bar has a high of 122 and a low of 120.5, and thus a 'X' will then be marked on each of 120.5, 121, 121.5 and 122. The same process repeats for the rest of the data in FIG. 6-A, and for brevity, the exact steps are not repeated here.

FIG. 6-B also shows that the resulting price distribution in the diagram approximates a normal distribution which is the usual case. In the diagram, each of the marked 'X' is called a base time unit (hereafter called BTU). Hence, each discrete price level on the Y-axis has a certain number of BTUs associated with it, which is a measurement of the amount of time the market has spent trading on the corresponding price level throughout the whole day.

FIGS. 7A and 7B illustrate an exemplary embodiment for building a frequency distribution diagram by the volume method. The preferred timeframe is daily and the price increment unit is 0.5. The volume traded for each discrete price throughout the whole day is shown in the accompanying table of FIG. 7-A. The volume data are obtained from tick volume and are expressed in terms of share quantity. In other embodiments, the volume data can be expressed in terms of dollar amount of shares traded, or number of contracts exchanged if the security is a commodity or a futures contract. FIG. 7-B shows the resulting frequency distribution diagram. The Y-axis plots the discrete price levels while the X-axis plots the volume traded for each price on the Y-axis. FIG. 7-B assumes that each 'X' represents 1000 shares. According to the table of FIG. 7-A, the price 124 has 1000 shares traded, thus one 'X' is marked on the price of 124 in the distribution diagram of FIG. 7-B. Similarly, the price 123 has 2000 shares traded at it and thus two 'X' are marked on the price of 123 in the distribution diagram. Other entries on the table are plotted in the same way on the distribution diagram. To be brief, repeated discussion for plotting the remaining entries is omitted.

For simplicity of illustration, herein after each 'X' in a frequency distribution diagram derived by the volume method is also called a BTU.

Notice that the distribution diagram in FIG. 7-B is deliberately constructed to look exactly the same as that in FIG. 6-B to facilitate subsequent discussion.

The user can choose whether the chart program internally derives the distribution diagram using the time or volume method. Those who are skilled in the art will realize that with perfectly liquid securities like currencies and index futures, the diagram derived from both methods are highly correlated. It is because all things being equal, the more time the market spends on trading at a price, naturally, the more volume traded there. However, this may not be true for illiquid securities like small-cap stocks. Inactive stocks can sometimes stay idle at the same price for most of the day with little or no volume traded. If so, the time method gives misrepresented results. On the other hand, for liquid securities, the time method is more preferable, since real-time volume for actively traded securities may not be precise. The user has to decide which method is used for different securities.

Modal Point

Consider a frequency distribution diagram such as that in FIG. 6-B regardless of whether it is computed using the time or volume method. As shown in FIG. 6-B, the price 120.5 has the greatest number of BTUs which can either be time units (if using the time method) or volume units (if using the volume method). Thus, it is the price level which the market has spent either the most time or the most volume trading on. 120.5 is called the Modal Point.

Sometimes there can exist more than one price level with the greatest number of BTUs. If that is the case, the chart program 110 by default displays the one which is closest to the midpoint of the preferred bar. It is called the central Modal Point. Alternatively, the chart program 110 can also be configured to display all the modal points on a single bar to the user.

Since there are two methods to obtain the frequency distribution diagram (time and volume), each method produces one set of modal points which can be different from the other. The user will decide whether the displayed modal points are calculated from the time or volume method. It should be noted that under normal circumstances, the modal points computed by the time method should approximate the counterparts computed by the volume method. This is because the more time the market spends on a certain price, naturally, the more volume it trades there.

Active Range

FIG. 8 illustrates a Mean-Deviated method used by the present invention to compute the Active Range using the frequency distribution diagram of FIG. 6 as an example. The method is now discussed in detail. Notice that each BTU represents a frequency unit (whether time or volume) for a certain price. Thus the frequency distribution diagram can be treated as a collection of a population of BTUs, each having a respective price. The present invention then computes the mean and standard deviation of the population of BTU prices. It then defines the Active Range to be the value of "mean±(standard deviation)(constant)" where the constant is predefined with a default value of 1. Hence, the Active Range, by default, represents the price range on the bar which encompasses approximately 68% (1 standard deviation) of all trading activities, either by time or by volume. The system reads the value of the constant from the parameter file 185 (FIG. 5). In FIG. 8, assume the constant is 1. Accordingly, the Active Range is equal to $\mu \pm \delta$ which equates (121.79, 118.21). Since the Active Range comprises 68% of trading activities, it can be treated as a fair equilibrium value of the market, as it is the price range which aggregate participants agree to trade throughout the bar interval.

In alternative embodiments, the mode or the median price is used instead of the mean price for computing the Active Range.

Figure 9:
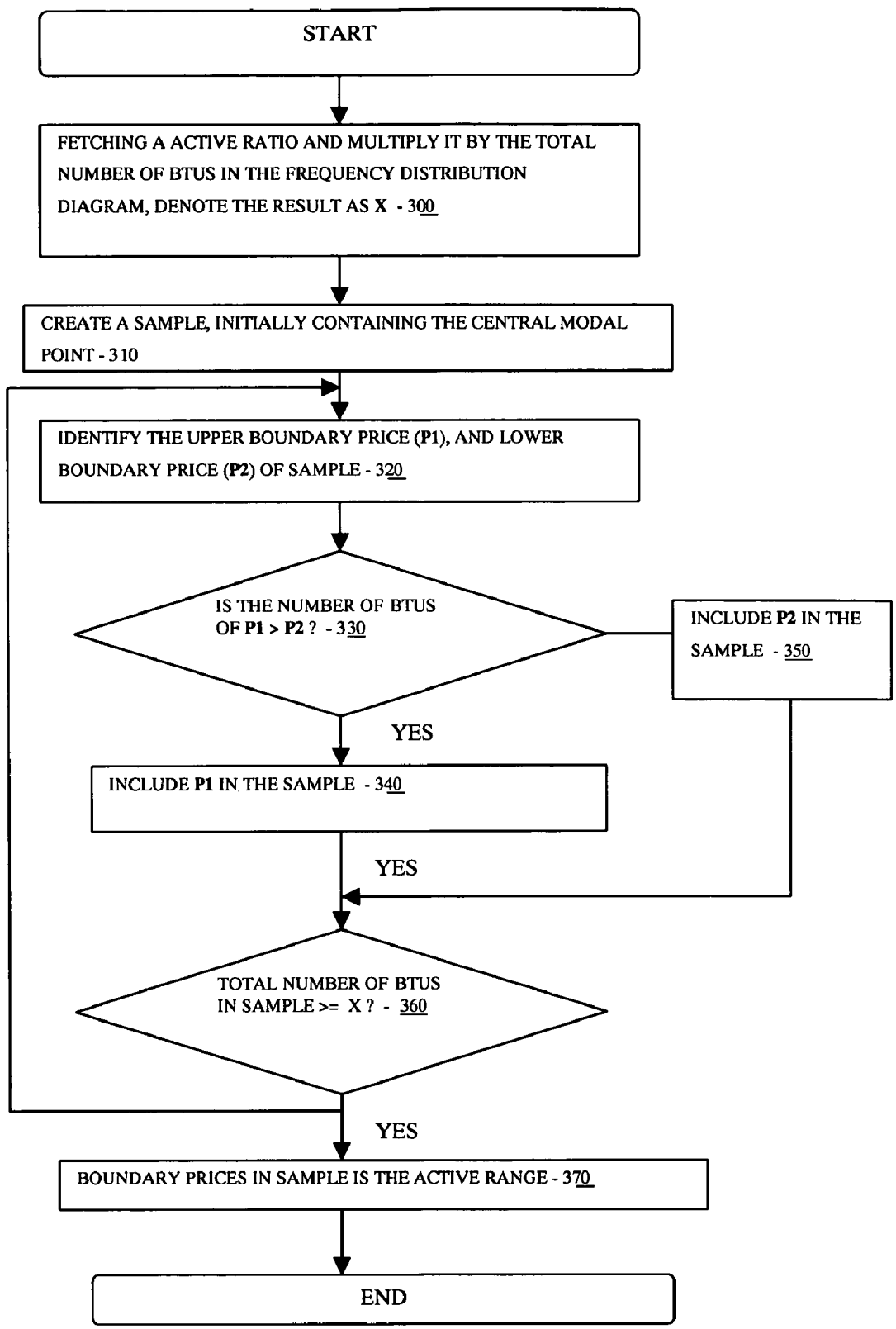
FIG. 9 illustrates a flow diagram for computing Active Range using the Dense Ratio Method.

An alternative method used by the present invention to compute the Active Range is called the Active Ratio Method. FIG. 9 illustrates the steps of the Active Ratio Method. In step 300, the chart program 110 first reads a percentage number from the parameter file 185. The percentage number is called the Active Ratio. Without loss of generality, assume that the number is 70%. The steps of deriving the Active Range from FIG. 6-B is now illustrated. Refer again to FIG. 6-B, the total number of BTUs in the frequency distribution diagram is 42 and 70% of 42 is 29 rounded to the nearest integer. Thus the value of X in step 300 is 29 according to this example. A sampling process is then carried out. In step 310, the sample starts out from the Central Modal Point which is 120.5, with 6 BTUs. Initially, the sample contains only 120.5. Next, according to step 320, the price 121 and 120 which are immediately above and below the sample boundaries are examined and step 330 then compares which price has more BTUs. Since 121 have more BTUs than 120 (5 versus 4), the price 121 is included in the sample according to step 340. The sample now contains 120.5 and 121. Next, according to step 360, since the sample only contains 11 BTUs which is less than 29, the sampling process continues. As such, the price 121.5 and 120 which are immediately above and below the sample boundaries are examined in step 320. Since the price 120 has more BTUs than the price 121.5 (4 versus 3), the price 120 is included in the sample in step 340. The process continues in the same way and for brevity similar steps are not shown. The sampling process stops when the sample contains at least 29 more BTUs which represents approximately 70% of the total number of BTUs in the population. The resulting Active Range is 119–122.5.

To conclude, the Active Range can be determined either by the time or volume method and for each time or volume method, there are two approaches (Mean-Deviated method and Active Ratio method) to derive the Active Range from the respective frequency distribution diagram. Thus, the system can have 4 sets of values for Active Range which may be different from each other. But it is very likely that the values are highly correlated. Whether the Active Range is calculated by the time or volume method and by which of the two approaches under the selected method, they are both read from the parameter file 185.

Dense Areas

Dense areas are defined as discrete price ranges with substantial activities, but not necessarily the largest activities, as in the case of Active Range. Hence, there can be more than one Dense Area on the same bar.

Figure 10:
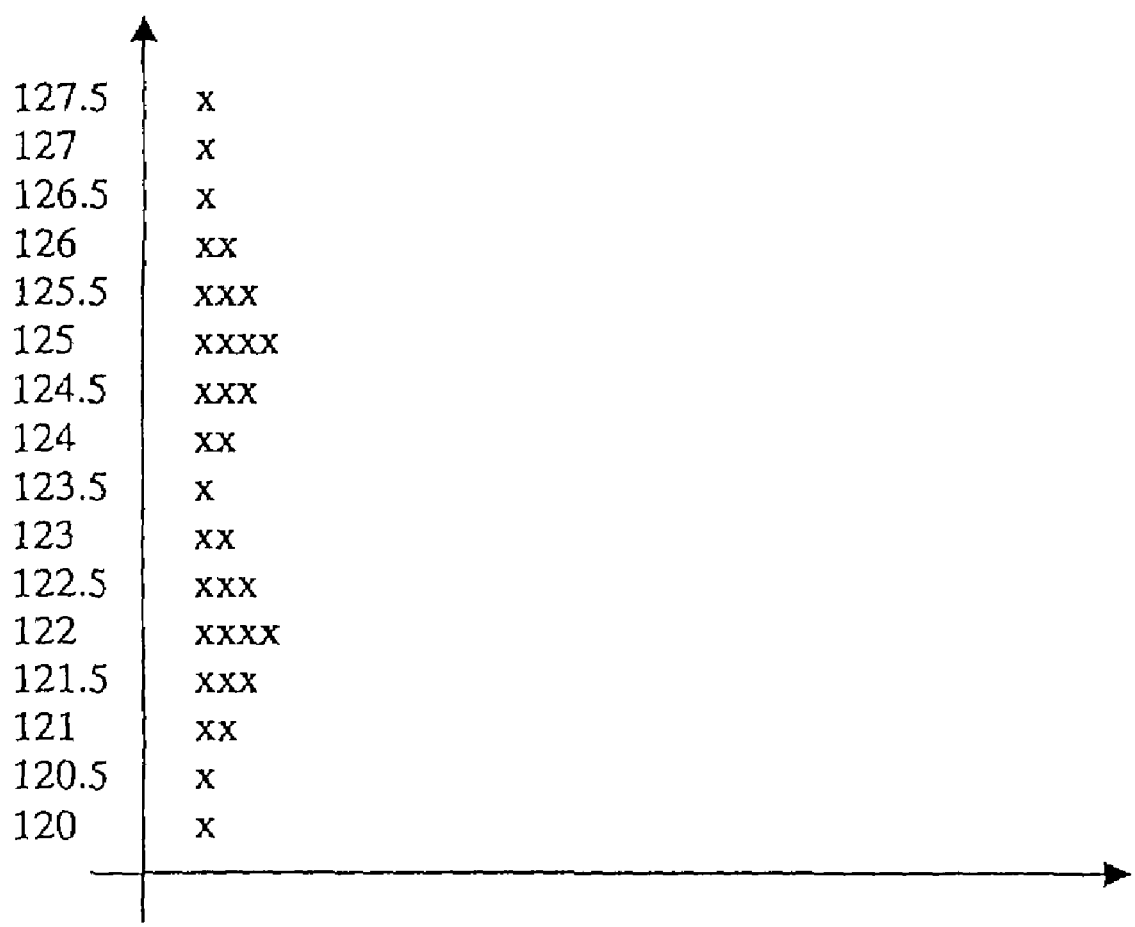
FIG. 10 illustrates an exemplary frequency distribution diagram which shows a double distribution pattern.

FIG. 10 shows a frequency distribution diagram in which the price movements does not resemble a normal distribution as that shown in FIG. 6-B. Rather, the pattern is that of a double distribution pattern. Visually, one can identify two price ranges which contain trading activities substantially higher than others, namely approximately 124.5–125.5, as well as 121.5–122.5. Thus, in this case, using one Active Range to represent the distribution is oversimplified. Instead, two Dense Areas should be used, each representing one of the distributions.

The method to quantify the Dense Areas is now explained using the distribution diagram of FIG. 10 as an example.

In one approach, a price interval is said to have substantial activities if the number of BTUs it has on the frequency distribution diagram is greater than a predefined arbitrary number, called the Dense Number. Selection of this number is very subjective. One way to estimate the appropriate dense number is to calculate the average number of BTUs each price contains in a frequency distribution diagram, which is called the density. For example, according to FIG. 10, there are 16 price levels and a 33 BTUs in total. Thus, the density is 33/16=2, rounded off to the nearest integer. As such, a price can be regarded as containing substantial activities if it has more than 2 BTUs. A more accurate estimation is to look at the average density of the recent, say 100 bars. The long-term average value is a better estimation since this density value will not be subject to day to day fluctuations.

Figure 11:
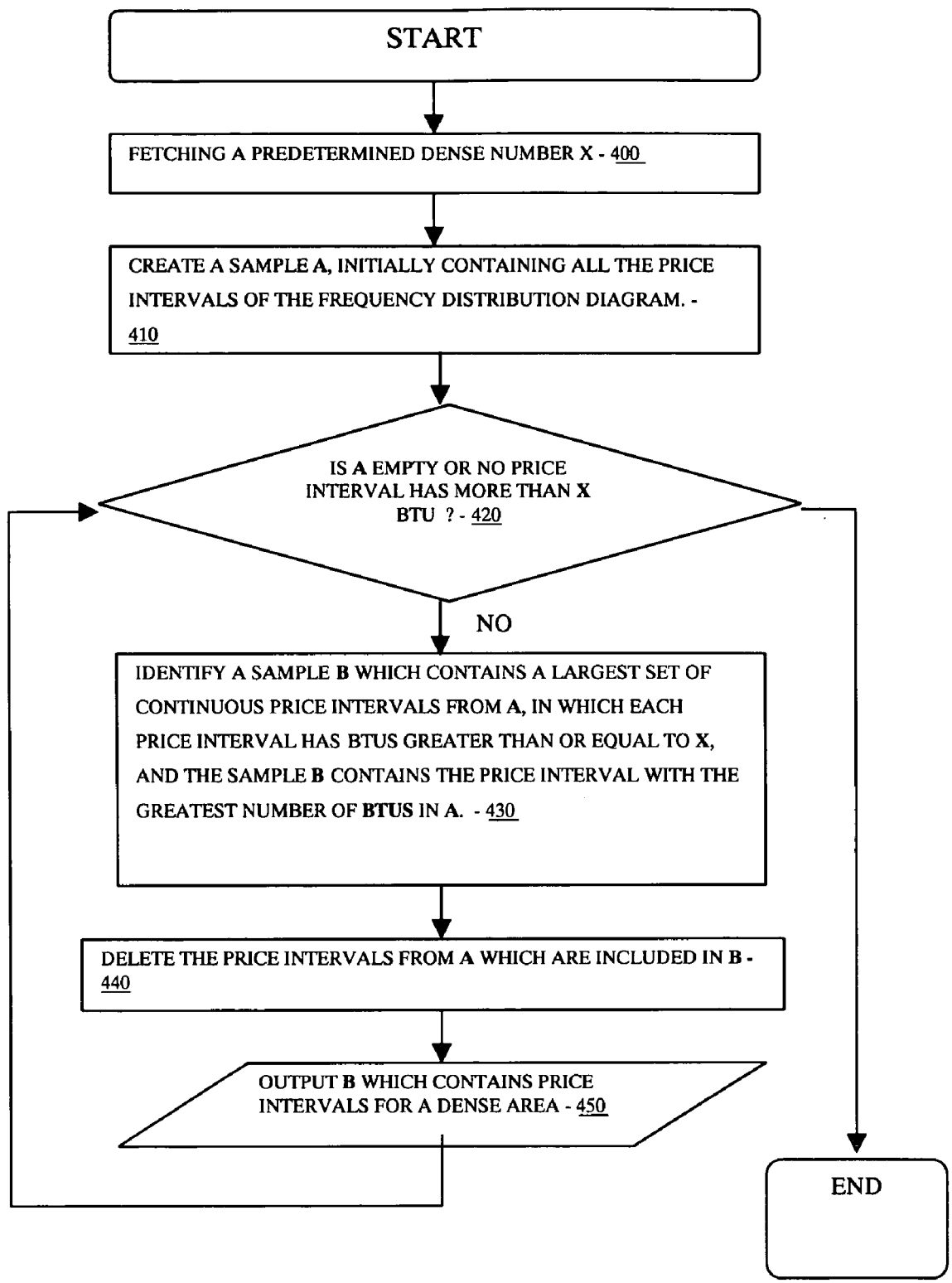
FIG. 11 illustrates the computation of Dense Areas using the Dense Number Method.

FIG. 11 illustrates the Dense Number Method for estimating Dense Areas. The predetermined dense number is fetched from the parameter file 185 (FIG. 5) in step 400. Assume this number is 2 (thus X=2). The chart program 110 then uses this number to calculate the Dense Areas by identifying discrete continuous price ranges which at each price level the number of BTUs is larger than the dense number. In step 410, a sample A is created which contains all the price intervals in the frequency distribution diagram.

Thus, according to FIG. 10, the sample A contains {120, 120.5, 121, 121.5, . . . 127, 127.5}. Next in step 430, the sample B is identified. The sample B should contain the central Modal Point in sample A, which happens to be 125. B also contains continuous price intervals, each of which contains more than 2 BTUs. Thus, according to FIG. 10, sample B is 124.5–125.5 because the range is the largest set of continuous price intervals in which each of the price interval has more than 2 BTUs. Next, in step 440, the price intervals of sample B are excluded from sample A. Thus, sample A, now contains {120, 120.5, 121,121.5, . . . 0.124, 126, 126.5, 127, 127.5}. In step 450, the content of B, 124.5–125.5, is outputted as the first Dense Area and will be stored either in memory or in database 115 for subsequent manipulation. Step 420 detects that the sample A is not empty and thus the algorithm attempts to identify another Dense Area. From step 430, a second Dense Area is identified as 121.5–122.5 which is stored in sample B and outputted at 450. After deleting B from A in the step 440, sample A now contains {120, 123, 123.5,124, 126.5, 127, 127.5}. As can be seen from FIG. 10, none of the remaining price intervals inside the remaining price intervals in A have more than 2 BTUs. Thus step 420 ends the algorithm.

Figure 12:
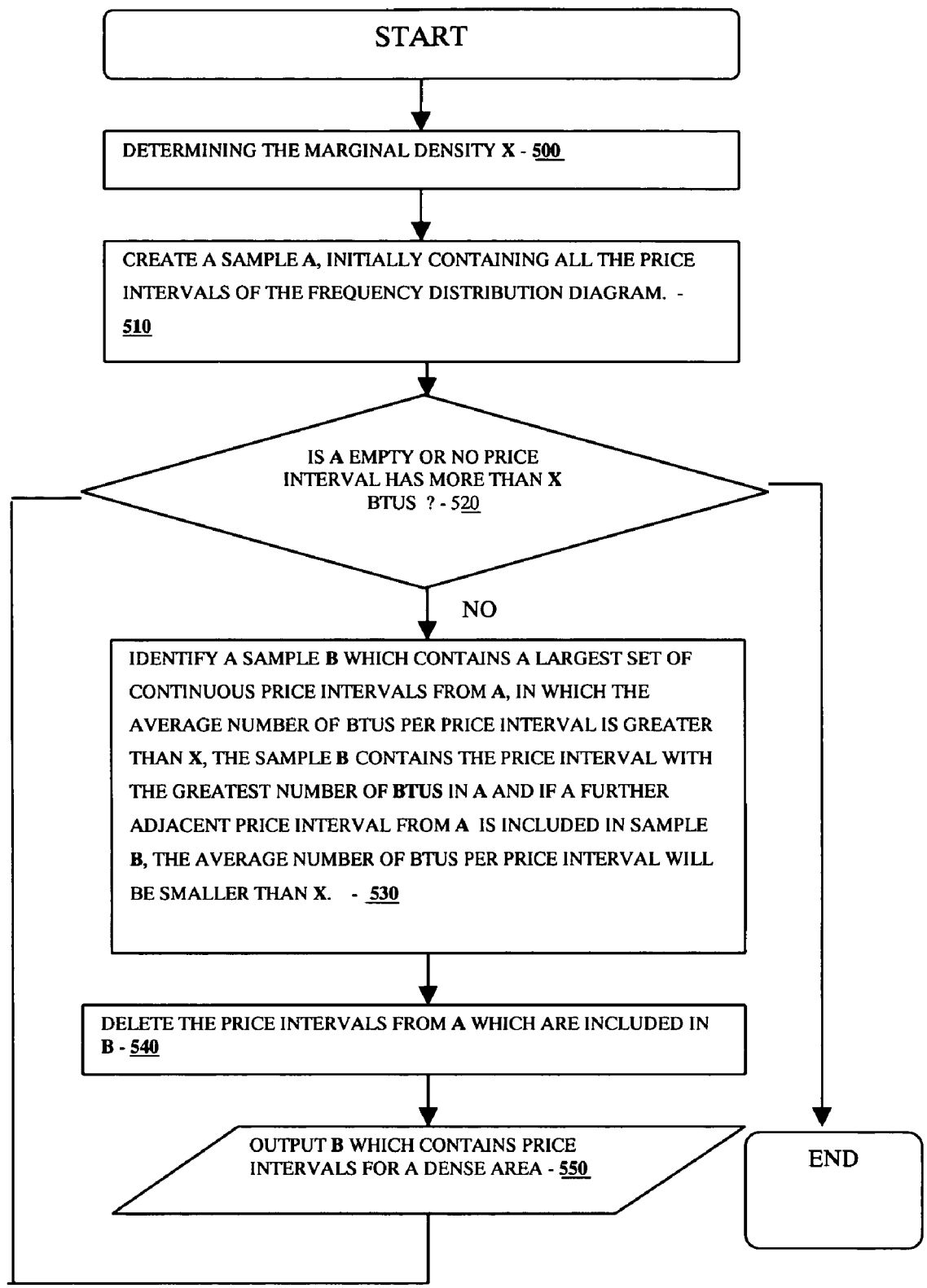
FIG. 12 illustrates the computation of Dense Areas using the Marginal Density Method.

FIG. 12 illustrates another approach used by the present invention to identify Dense Areas, called the Marginal Density Method. This approach does not make use of a dense number. Rather, it reads a marginal density X from the parameter file 185 (FIG. 5) in step 500.

Under this approach, a dense area is defined as the largest continuous price range which contains density greater than X.

The algorithm for the Marginal Density Method outlined in FIG. 12 is now illustrated using the frequency distribution diagram of FIG. 10 as an example. Assume we select a multiple value equal to 1.5 and the long-term moving average density is 2, the approach identifies non-overlapping dense areas which have density marginally greater than 3 (1.5×2). According to step 510 in FIG. 12, this approach starts out from 125 which is the central Modal Point. The sample A now contains 125 and thus has a density equal to 4 since the price 125 has 4 BTUs. Next in step 530, a sample B is identified which contains the largest set of continuous price intervals containing 125 and has a density greater than 3. If a further adjacent price interval is included, the density is smaller than 3. As such, according to FIG. 10, B contains 124.5–125.5. To see why this is the case, consider the price range 124.5–125.5. It contains 10 BTUs and 3 price intervals, and thus an average equal to 3.33=(10/3), which is greater than 3. The price intervals adjacent to B are 126 and 124 respectively. Suppose we include 126 in B, the density will then become 3=((10+2)/4) which is not greater than 3. Thus 126 cannot be included in B. Suppose we include 124 in B, the density will then become 3=((10+2)/4) which is also not greater than 3. Thus 124 cannot be included in B. Thus 124.5–125.5 is the largest continuous price range we can get with density marginally greater than 3. The sample in B is outputted as the first Dense Area in step 550 and the price intervals from B are deleted from A in step 540. After step 540, A then contains {120, 120.5, . . . 124, 126, 126.5 . . . . 127.5}. This process is then repeated. For brevity, the exact steps are not repeated here. Those who have ordinary skill in the art will realize that according to the algorithm, the second identified Dense Area is 121.5–122.5.

In short, the Dense Areas can be determined either by the time or volume method For each time or volume method, there are two approaches (Dense Number and Marginal Density) to derive the Dense Areas from the respective frequency distribution diagram. Thus, the system can have 4 sets of Dense Areas which can be different from each other, but it is very likely that the values are highly correlated. Whether the Dense Areas are calculated by the time or volume method and by which of the two approaches under the selected method, are they both read from the parameter file 100.

It should further be noted that in the above examples, only two Dense Areas were found. Those who are skilled in the art will realize that it is possible to have more than two Dense Areas identified in a frequency distribution diagram.

Extremes Tails

Refer back to FIG. 6-B. again. Notice that the continuous price range of 123–124 from the bar high as well as the continuous price range of 116–118.5 from the bar low contain only one or two BTUs. They are called Extreme Tails since price range with only 1–2 BTUs mean that the market had minimal trading activities at that range whether the trading activities are expressed in time or volume. A further restriction for the extreme tail is that the market does not trade there during the last predefined interval of the bar. Thus, suppose the last predefined interval is the final trading hour, and the second 'X' of 123 in FIG. 6-B. happened at that time interval, the price 123 is not included in the Extreme Tail. The Extreme Tail on the upside will then only be 123.5–124 instead of 123–124. Note that because of the above restrictions, not every bar has Extreme Tails. Furthermore, the maximum number of BTUs a price can have in order to be included in an Extreme Tail is arbitrary and is not necessarily equal to two which is used in the above explanation. The system fetches the value as well as the above-mentioned predefined interval from parameter file 185.

Refer to FIG. 10 again. Notice that even though the price 123.5 has only one BTU, it is not an extreme because it occurs in the middle. Extremes are continuous price ranges starting from either the bar high or bar low. If the bar high is not an extreme itself (having more than 2 BTUs or occurring in the final predefined interval), then no extreme tail is drawn from the high. Similarly, if the bar low is not an extreme itself, no extreme tail is drawn from the bar low.

Preferred Embodiment of Overlaying Method

Refer back to FIG. 2-A again which shows the appearance of the bar formed under the present invention. In FIG. 2-A, the underlying price-time chart is a Bar Chart. The values of Active Range 30, Modal Point 35, and Extreme Tail 40 are overlaid on the chart. The Active Range 30 is displayed as a rectangle drawn symmetrically around the central axis of the bar. As shown, if the close 25 is higher than the open 10, the Active Range 30 is hollow (FIG. 2-A-I), otherwise it is colored (FIG. 2-A-II). This coloring scheme is similar to that used to color the body of the bar in a Japanese Candlestick Chart (FIG. 1-B). The central Modal Point 35 is displayed as a colored dot on the central axis of the bar. The Extreme Tails 40 are displayed as thick colored lines drawn on top of the central axis of the bar. The Dense Areas 45 are not overlaid in FIG. 2-A, because doing so will blur the appearance of the bar.

Alternatively, FIGS. 13A and 13B show how the system or users can opt to display Dense Areas 45 instead of the Active Range 30. In FIG. 13-A, the close 25 is higher than the open 10 and thus the Dense Areas 45 are hollow. In FIG. 13-B, the open 10 is higher than the close 25 and thus the Dense Areas 45 are filled. The presentation style of Dense Areas 45 is similar to that of the Active Range 30. Notice that the resulting bar under the present invention as shown in FIG. 2-A and FIG. 13-A resembles the appearance of the Japanese Candlestick. Thus, users who are used to the Bar Chart and Japanese Candlestick Charts will not find the bars of the present invention unfamiliar. Besides it should be noted that in FIG. 13, each of the bars contain only two Dense Areas. However, it is possible that the bar may contain any number of Dense Areas. Each Dense Area has a separate rectangle representing it.

Refer now to FIG. 2-B which displays the appearance of the bar formed by the present invention under the preferred embodiment when the underlying price-time chart is a Japanese Candlestick Chart. FIG. 2-B-I shows the case when the close 25 is higher than the open 10 while FIG. 2-B-II is vice versa. The Active Range 30 is displayed as a rectangle drawn symmetrically around the virtual axis of the bar. The rectangle has a stripe pattern to distinguish it from the original rectangle used to represent the body of the candlestick. The central Modal Point 35 is displayed as a colored dot on the imaginary axis of the bar. The Extreme Tails 40 are displayed as thick colored lines drawn on top of the imaginary axis of the bar at both ends. The Dense Areas 45 are not overlaid in FIG. 2-B, because doing so will blur the appearance of the bar. Alternatively, FIGS. 14A and 14B show that the system or users can opt to display Dense Areas 45 instead of the Active Range 30. (In FIG. 14-A, the close 25 is higher than the open 10 and vice versa in FIG. 14-B). Notice that the stripe pattern in FIGS. 14A and 14B for the Dense Areas 45 are slightly different from that of the Active Range 30 in FIGS. 13A and 13B is done so to facilitate distinction. It should be noted that in FIGS. 14A and 14B each of the bars contains only two Dense Areas. However, it is possible that the bar may contain any number of Dense Areas. Each Dense Area has a separate rectangle representing it.

Alternative Embodiments for Overlaid Method

Other embodiments for alternative overlaying methods are possible. FIGS. 15A–15H show alternative appearances of a bar of the present invention which includes only a subset and not all of the intra-market elements, with the underlying price time chart being a Bar Chart. In FIGS. 15-A and 15-E, the Modal Points are not shown. In FIGS. 15-B and 15-F, the Active Ranges are not shown. In FIGS. 15-C and 15-G, the Extreme Tails are not shown. In FIGS. 15-D and 15-H, only the central Modal Points are shown.

FIGS. 16A–16F show other embodiments for the appearance of the bar formed by the present invention with the underlying price-time chart being a hybrid of the Bar Chart. In FIG. 16-A and 16-D, the underlying bar does not have the opening price displayed. In FIGS. 16-B and 16-E, the underlying bar does not have the close price displayed. In FIGS. 16-C and 16-F, the underlying bar does not have both the open and close prices displayed. Those with an ordinary skill of art will realize that other combinations are possible.

Other embodiments for alternative overlaying methods are possible. FIGS. 17A–17F show alternative appearances of a bar of the present invention which includes only a subset and not all of the intra-market elements, with the underlying price time chart being a Japanese Candlestick Chart. In FIGS. 17-A and 17-D, only the Modal Points are shown. In FIGS. 17-B and 17-E, the Modal Points are not shown. In FIGS. 17-C and 17-F, the Extreme Tails are not shown. Those who have an ordinary skill of the art will realize that other combinations are possible.

FIGS. 17A–17F show another embodiment in which more than one Modal Point is displayed. FIG. 17-A shows the bar where the underlying price-time chart is a Bar Chart whereas for FIG. 17-B the underlying price-time chart is a Japanese Candlestick Chart.

In yet another alternative embodiment, the user is allowed to select which intra-market elements are overlaid on the underlying price-time chart and in what geometric figures, sizes, color schemes, and textures that they are displayed. The user-defined settings are stored in the parameter file 185 FIG. 5.

Those who have ordinary skill in the art will appreciate that the intra-market elements can be displayed in many combinations of geometric forms and it would be impossible for the present invention to describe all the possibilities existed. The spirit of the present invention is to overlay the elements in ways in which the user will not find the resulting bar look too unfamiliar compared to the conventional bar from the Bar Chart or the Japanese Candlestick Chart.

Real-Time Update Embodiment

Figure 19:
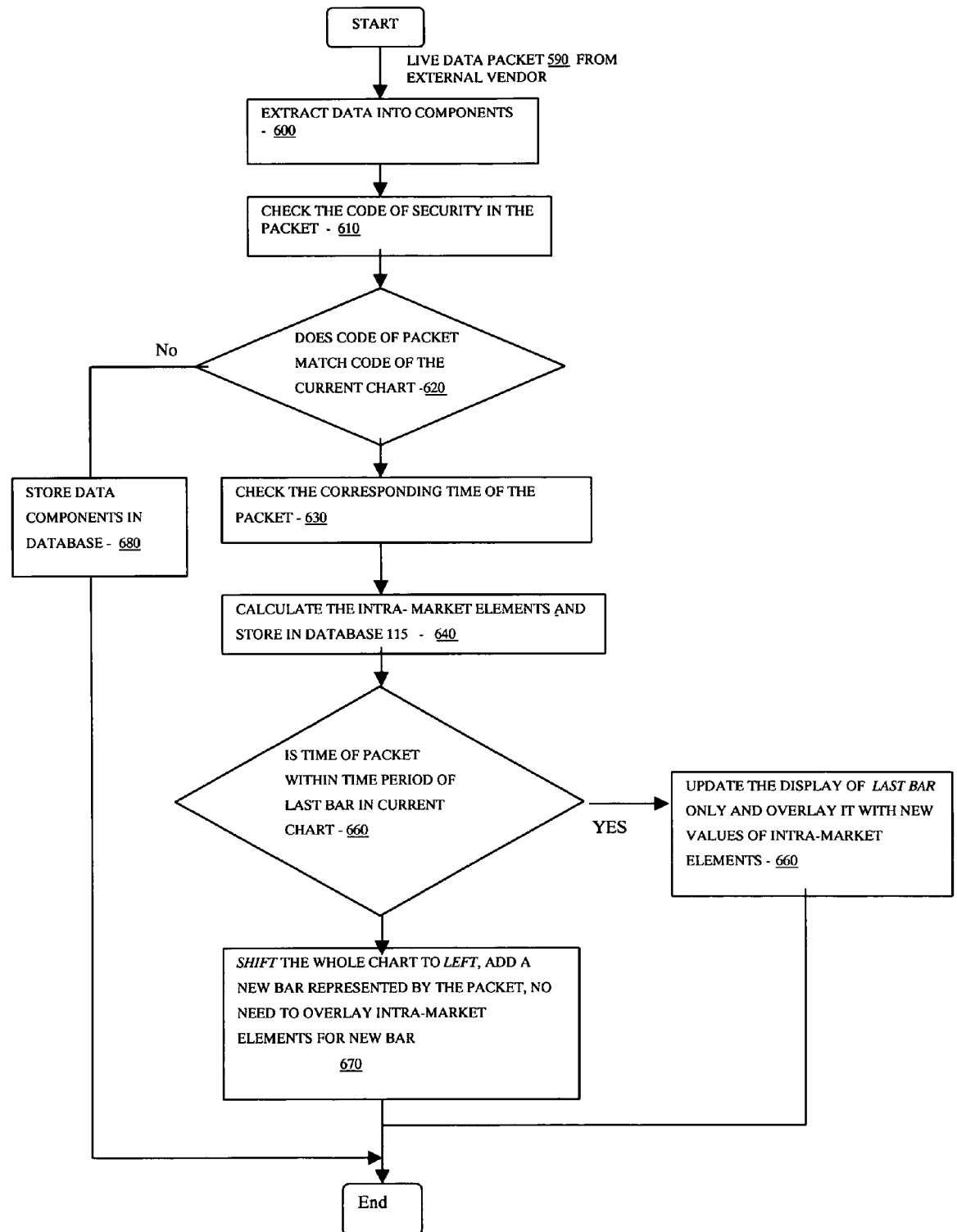
FIG. 19 is an exemplary embodiment for the real-time chart updating process.

FIG. 19. shows an embodiment in which the chart program is operating in a real-time environment. FIG. 19 assumes that the user is currently viewing the chart of a certain commodity with a given timeframe and with overlaid intra-bar elements under the present invention. A real-time price packet 590 arrives to the chart program via the data interface 120 of FIG. 3. The price packet consists of the code of the security, price, date, time, volume, and other pertinent information. In step 610, this information is extracted from the packet 590. In step 620, the code of packet 590 is checked against the code of the current chart. If the security corresponding to the price packet is not the security of the chart being viewed, no chart display update is necessary. The data of the packet 590 is stored in the database 115 in step 680 in order to be retrieved later. On the other hand, suppose the security corresponding to the price packet 590 is the same as the security of the chart being viewed, updating is then necessary. First the time-stamp corresponding to the security is checked in step 630. If the time-stamp is within the time interval represented by the most recent bar in the chart after the comparison step 650, the chart program only needs to update the display of the most recent bar in the chart in step 660. As an example, suppose the chart is an hourly chart and the most recent bar corresponds to the time interval of 11:00–12:00. If the time-stamp is 11:45, then the chart program only needs to update the display of this recent bar. To update the most recent bar, the intra-bar elements for the most recent bar will be recalculated in step 640 with the additional price from the packet. The new values of the OHLC as well as the intra-bar elements will be displayed. The recalculated values will be updated to the database 115. On the other hand, if the time-stamp is beyond the time interval represented by the most recent bar in the chart, then the whole chart will shift to the left by one time unit and a new bar is formed in step 670. The new bar has all of the OHLC equal to the price of the packet. The intra-market elements corresponding to this new bar will also be calculated in step 640. The chart program may not display the intra-market elements at this point because the bar contains only one price and will render the elements virtually meaningless. It displays, if noverlaid, will blur the appearance unnecessarily.

Although only a few exemplary embodiments of this invention have been described in detail above, those skilled in the art will readily appreciate that many modifications are possible in the exemplary embodiments without materially departing from the novel teachings and advantages of this invention. For example, in another embodiment, it is possible that the chart program does not build a frequency distribution diagram. Rather, it just records the price with the highest volume or time traded throughout the time period which is the Modal Point and overlays it on the bar. Yet in another embodiment, the Active Range and Dense Areas can be computed using other similar statistical parameters such as semi-variance or third moments (rather than the standard deviation used by the present invention). Accordingly, all such modifications are intended to be included within the scope of this invention as defined in the following claims.

The invention claimed is:

1. A computerized method for monitoring for a user the price activities of a financial instrument traded in a financial instrument traded in a financial market in a given timeframe, comprising the steps of:
   (a) plotting a plurality of bars on a price-time chart by a processor wherein said price-time chart is a two dimensional chart, with the Y-coordinate representing price and X-coordinate representing time, with the X-axis divided into a predetermined plurality of discrete intervals, wherein each interval has a bar of the plurality of bars associated with it, each interval represents an amount of time equal to that of the given timeframe, each bar indicates at least a high price and a low price traded by the market during the associated time interval of the bar and each bar is vertically displayed on said chart;
   (b) employing with the processor a bar from said chart and building a frequency distribution with the processor wherein an interval between a high and low price of said bar is divided into a plurality of discrete predetermined price intervals and said frequency distribution identifies the amount of trading activities taken place in each of the said discrete price intervals within the period of time represented by said bar;
   (c) deriving with the processor a set of discrete intra-market elements from said frequency distribution, said set of discrete intra-market elements comprising an active range defined by a continuous price range containing substantially high trading activities determined by a first statistical range extending from a statistical center calculated from said frequency distribution, a modal point defined by the highest trading activities for a price in the time interval, and an extreme tail defined by a continuous price range containing substantially low trading activities determined by a second statistical range beyond said first range;
   (d) representing on a computer display device each element of said set of intra-market elements by a first geometric figure, and overlaying said first geometric figure onto said bar; and
   (e) displaying on a computer display device the overlaid price-time chart to the user.

2. The method of claim 1, wherein said trading activities defined on a price interval is the total volume traded within the price interval throughout the period of time represented by said bar.

3. The method of claim 1, wherein said trading activities defined on a price interval are the number of predetermined constant time units the market trades at least once within the said price interval throughout the time period represented by said bar, and wherein each said predetermined constant time unit represents a time interval substantially smaller than the time interval represented by said bar.

4. The method of claim 1, wherein said price-time chart is a bar chart.

5. The method of claim 1, wherein said price-time chart is a Japanese candlestick chart.

6. The method of claim 1, wherein the price chart is a bar chart without at least one of the open and close price displayed.

7. The method of claim 1, further comprising:
   graphically representing on a computer display device a price interval with the highest trading activities by a dot, said dot having a diameter substantially smaller than the physical length of a time interval on the X-axis of said price-time chart, said dot having a center collinear with the high and low price of said bar, and the said dot having a Y-coordinate centered on the mid-point of said price interval.

8. The method of claim 1, wherein said continuous price range with substantially low trading activities is a continuous price range with the top end being the high price of said bar, said continuous price range encompasses a set of price intervals on the frequency distribution diagram, and each price interval of said set of price intervals contains trading activities below a predetermined amount; and the step of representing each element further comprises:
   graphically representing on a computer display device said continuous price range on said bar by a second geometric figure.

9. The method of claim 8, wherein said second geometric figure is a vertical line with a predefined width and color connecting the high and low of said price range, said vertical line is overlaid on an imaginary line joining the high and low price of said bar.

10. The method of claim 1, wherein said continuous price range with substantially low trading activities is a continuous price range with the bottom end of the range being the low price of the bar, said continuous price range encompasses a set of price intervals on the frequency distribution diagram, and each price interval of said set of price intervals contains trading activities below a predetermined amount; and the step of representing each element further comprises:
   graphically representing on a computer display device said continuous price range with substantially low trading activities on said bar by a third geometric figure.

11. The method of claim 10, wherein said third geometric figure is a vertical line with predetermined width and color connecting the high and low price of said price range, and said vertical line is overlaid on an imaginary line joining the high and low price of said bar.

12. The method of claim 1, further comprising:
   graphically representing on a computer display device at least one continuous price range with substantially high trading activities by a fourth geometric figure and overlaying said fourth geometric figure onto said bar, said fourth geometric figure being a rectangle with a predetermined width and length, said rectangle has vertices with Y-coordinates enclosing said continuous price range with substantially high trading activities, and said rectangle has the center collinear with the high and low price of said bar.

13. The method of claim 12, further comprising a coloring scheme wherein said rectangle is hollow if a close price is higher than an open price indicated by said bar, and is filled if the close price is lower than the open price of said bar.

14. The method of claim 12, wherein said price-time chart is a Japanese Candlestick Chart and said rectangle has an identical width with a body of said bar, and said rectangle contains a pattern to distinguish it from the body of said bar.

15. The method of claim 14, wherein said pattern is a slanted stripe pattern.

16. The method of claim 1, wherein said continuous price range containing substantially high trading activities is derived by steps comprising:
   (a) calculating by a processor a mean price X of the price distribution from said frequency distribution;
   (b) calculating by a processor a standard deviation price Y of the price distribution from said frequency distribution; and
   (c) defining with a processor said continuous price range to be the value X±(Y) (b), wherein b is a predetermined constant.

17. The method of claim 1, wherein said continuous price range containing substantially high trading activities is derived by steps comprising:
   fetching a predetermined constant, summing the trading activities in the frequency distribution to arrive at a total amount, multiplying said predetermined constant by the said total amount of trading activities, and denoting the result; and
   wherein said continuous price range containing substantial trading activities is the narrowest price range in the frequency distribution which contains total trading activities larger than the result.

18. The method of claim 1, wherein said continuous price range containing substantially high trading activities includes a set of discrete price intervals which comprises at least one price interval and said set of discrete price intervals containing average trading activities greater than a predetermined amount.

19. The method of claim 1, wherein said continuous price range containing substantially high trading activities includes a set of discrete price intervals which comprises at least one price interval, each price interval inside said set of discrete price intervals contains trading activities greater than a predetermined amount.

20. The method of claim 1, wherein the step of taking a bar from the chart further comprises:
   taking each of the bars from the said chart, and determining frequency distribution for each bar;
   and the step of deriving a set of discrete intra-market elements further comprises:
   for each of the bars, deriving set of intra-market elements from the corresponding frequency distribution, said set of intra-market elements comprise at least one intra-market element;
   and the step of representing each element further comprises:
   graphically representing on a computer display device each intra-market element of said set of intra-market elements by a fifth geometric figure and overlaying said fifth geometric figure onto the bar.

21. The method of claim 1, wherein said frequency distribution diagram is built internally by a computer while the price-time chart with the overlaid intra-market elements is displayed on a computer display device to the user.

22. The method of claim 1, further comprising:
   allowing the user to select the set of intra-market elements of be overlaid on said price-time chart.

23. The method of claim 1, further comprising:
   allowing the user to define the geometric figure used to represent an intra-market element.

* * * * *